US010749171B2

(12) United States Patent
Chen et al.

(10) Patent No.: US 10,749,171 B2
(45) Date of Patent: Aug. 18, 2020

(54) METHOD FOR THE PREPARATION OF ANODES FOR LITHIUM BATTERIES

(71) Applicants: Zhongwei Chen, Waterloo (CA); Aiping Yu, Waterloo (CA); Fathy Mohamed Hassan, Waterloo (CA)

(72) Inventors: Zhongwei Chen, Waterloo (CA); Aiping Yu, Waterloo (CA); Fathy Mohamed Hassan, Waterloo (CA)

(*) Notice: Subject to any disclaimer, the term of this patent is extended or adjusted under 35 U.S.C. 154(b) by 49 days.

(21) Appl. No.: 15/548,549

(22) PCT Filed: Feb. 5, 2016

(86) PCT No.: PCT/CA2016/050108
§ 371 (c)(1),
(2) Date: Aug. 3, 2017

(87) PCT Pub. No.: WO2016/123718
PCT Pub. Date: Aug. 11, 2016

(65) Prior Publication Data
US 2018/0013138 A1    Jan. 11, 2018

Related U.S. Application Data

(60) Provisional application No. 62/176,004, filed on Feb. 6, 2015.

(51) Int. Cl.
*H01M 4/36*    (2006.01)
*H01M 4/04*    (2006.01)
(Continued)

(52) U.S. Cl.
CPC ......... *H01M 4/366* (2013.01); *H01M 4/0471* (2013.01); *H01M 4/133* (2013.01);
(Continued)

(58) Field of Classification Search
CPC ...... H01M 4/366; H01M 4/668; H01M 4/667; H01M 4/663; H01M 4/583; H01M 4/1397; H01M 4/136; H01M 4/1395; H01M 4/134
See application file for complete search history.

(56) References Cited

U.S. PATENT DOCUMENTS

| 8,865,346 B2 | 10/2014 | He et al. |
| 2002/0015894 A1* | 2/2002 | Wariishi ............... C08F 246/00 429/314 |

(Continued)

FOREIGN PATENT DOCUMENTS

| CN | 104269516 A |   | 1/2015 |
| CN | 104319372 A | * | 1/2015 |

(Continued)

OTHER PUBLICATIONS

English machine translation of Yoon et al. (KR 20020068930 A) (Year: 2002).*

(Continued)

*Primary Examiner* — Stewart A Fraser
(74) *Attorney, Agent, or Firm* — Holzer Patel Drennan

(57) ABSTRACT

A method for preparing an electrode for use in lithium batteries and the resulting electrodes are described The method comprises coating a slurry of silicon, sulfur doped graphene and polyacrylonitrile on a current collector followed by sluggish heat treatment.

16 Claims, 31 Drawing Sheets

(51) Int. Cl.

| | | |
|---|---|---|
| H01M 4/133 | (2010.01) | |
| H01M 4/1395 | (2010.01) | |
| H01M 4/1393 | (2010.01) | |
| H01M 4/62 | (2006.01) | |
| H01M 4/134 | (2010.01) | |
| H01M 10/052 | (2010.01) | |
| H01M 4/136 | (2010.01) | |
| H01M 4/1397 | (2010.01) | |
| H01M 4/583 | (2010.01) | |
| H01M 4/66 | (2006.01) | |
| H01M 10/0525 | (2010.01) | |
| H01M 4/02 | (2006.01) | |

(52) U.S. Cl.
CPC ......... *H01M 4/134* (2013.01); *H01M 4/136* (2013.01); *H01M 4/1393* (2013.01); *H01M 4/1395* (2013.01); *H01M 4/1397* (2013.01); *H01M 4/583* (2013.01); *H01M 4/62* (2013.01); *H01M 4/622* (2013.01); *H01M 4/624* (2013.01); *H01M 4/625* (2013.01); *H01M 4/663* (2013.01); *H01M 4/667* (2013.01); *H01M 4/668* (2013.01); *H01M 10/052* (2013.01); *H01M 10/0525* (2013.01); *H01M 2004/027* (2013.01)

(56) References Cited

U.S. PATENT DOCUMENTS

| | | | |
|---|---|---|---|
| 2013/0045427 A1* | 2/2013 | Zhamu | H01M 4/38 429/403 |
| 2013/0260189 A1 | 10/2013 | Schaefer et al. | |
| 2014/0186695 A1 | 7/2014 | Moganty et al. | |
| 2014/0272610 A1* | 9/2014 | Amine | H01M 4/583 429/405 |

FOREIGN PATENT DOCUMENTS

| | | | |
|---|---|---|---|
| CN | 104332616 A | | 2/2015 |
| KR | 20020068930 A | * | 8/2002 |

OTHER PUBLICATIONS

English machine translation of Wang et al. (CN 104319372 A) (Year: 2015).*

International Search Report and Written Opinion, dated Jun. 13, 2016, ISA/CA.

Hassan et al., "Evidence of Covalent Synergy in Silicon-Sulfur-Graphene Yielding Highly Efficient and Long-life Lithium Batteries", Nature Communications, vol. 6, Article No. 8597, Oct. 26, 2015.

Liu et al., "Three-Dimensional Hierarchical Ternary Nanostructures for High-Performance Li-Ion Battery Anodes", *Nano Letters*, 2013, vol. 13 (7), pp. 3414-3419.

Wang et al., "Carbon-sulfur composites for Li—S batteries: status and prospects", *Journal of Materials Chemistry A*, 2013 vol. 1, pp. 9382-9394.

De Guzman, Rhet C. et al., "Effects of graphene and carbon coating modifications on electrochemical performance of silicon nanoparticle/graphene composite anode", Journal of Power Sources 246 (2014), pp. 335-345.

Piper, Daniela Molina et al., "Conformal Coatings of Cyclized-PAN for Mechanically Resilient Si nano-Composite Anodes", Advanced Energy Materials (2013), pp. 697-702.

Yun, Young Soo et al., "Effects of sulfur doping on graphene-based nanosheets for use as anode materials in lithium-ion batteries", Journal of Power Sources 262 (2014), pp. 79-85.

* cited by examiner

METHOD FOR THE PREPARATION OF ANODES FOR LITHIUM BATTERIES

FIELD

The present invention relates to a method for the preparation of electrodes for lithium batteries and to the anodes prepared by said method. More particularly it relates to a method for preparing an anodes comprising silicon particles bound to sulfur-doped graphene combined with polyacrylonitrile.

BACKGROUND

The success of high performance portable electronics and hybrid (or electric) vehicles strongly depends on further technological progress of commercially available rechargeable batteries. Lithium-ion batteries (LIBs) are considered the most likely energy storage configuration to satisfy these demands. However, this requires significant advances in terms of power density, energy density, cycle life and safety, as well as lower production costs. Current LIBs utilize graphite anodes where energy is stored by intercalating lithium into the graphite layers. This arrangement while commercially successful can only deliver a maximum theoretical capacity of 370 mAhg-1, (Shang W. J.; *A review of the electrochemical performance of alloy anodes for lithium ion batteries*, J. Power Sources 196, 13-24 (2011)). Incorporating additional components offers the potential to dramatically improve this capacity. For example silicon can provide up to 4200 mAhg-1, in theory, corresponding to the following alloying reaction:

$$4.4\ Li + Si \rightarrow Li4.4Si \qquad (1)$$

While Si-based composites offer immense promise as new generation anode materials, extreme changes in volume during lithiation and delithiation lead to structural degradation and loss of performance over time that impedes their practical application.

Several journal articles as well as patents are concerned with the improving performance and cycle stability of silicon. Magasinski et al. (Nature Material, 9 (2010) 353-358) prepared silicon nanoparticles by silane decomposition onto annealed carbon-black dendritic particles and followed by coating with carbon in a chemical vapour deposition (CVD) process. This paper describes reversible capacities over five times higher than that of the state-of-the-art anodes (1950 mA h g−1) and stable performance. Cui et al. (Nature Nanotechnology, 3 (2008) 31-35) prepared high performance anodes based on silicon nanowires. They prepared the silicon nanowires in a CVD process using the vapour-liquid-solid (VLS) method with gold as a catalyst. The paper describes achieving the theoretical capacity of the silicon anodes and maintained a discharge capacity close to 75% of the maximum. However, this process employs costs catalyst material. Kim et al. (Nano letters, 8, (2008) 3688-3691) prepared a Si core and carbon shell structure by using SBA-15 mesoporous silica material as a template. They reached a first charge capacity of 3163 mA h/g with a coulombic efficiency of 86% at a rate of 600 mA/g, and they retained 87% of their capacity after 80 cycles. However, when they increased the rate capability to 6 A/g the capacity decreased to 78%. In US 2005/0031957 A1, silicon microparticles were mixed with an electrochemically inactive phase that includes an intermetallic compound that is formed of at least two metals and a solid solution yielding a composition of Si55Al30Fe15 (for example). Even though, these electrodes showed improved cycle stability, they had a great loss in specific capacity due to the inclusion of inactive components in the electrode. US 2009/0130562, describes coated silicon nanoparticles with carbon and their use as anode material. The composite material comprising silicon, carbon and graphite showed a capacity of around 900 mAh/g for almost 5 cycles. US 2010/0062338 A1, describes the use of silicon nanoparticles as an active material and an elastomeric binder to bind the silicon nanoparticles as well as the addition of conductive material such as super P or graphite. In this patent the author claims that these electrode additives improved cycle stability of the battery; however, they did not disclose specific performance results. In US 2012/0121977 A1, the inventors describe an interfacial layer around the silicon nanoparticle. The layer has good electron conductivity, elasticity and adhesion. This layer is formed of a monomer and a polymer with several functional groups. The capacity is about 400 mAh/g and increasing with the cycle number up to a maximum at about 1000 mAh/g at about 100 cycles then decay back during the next 100 cycles reaching 700 mAh/g at the 200th cycle. In US 2012/0129054, the inventors used silicon nanowires with or without carbon coating and also they claim the addition of diallyl pyrocarbonate to the electrolyte during the battery fabrication.

US2014/0186701 to Zhang et al. describes a composite anode prepared by electrophoretic deposition (EDP) of a suspension comprising one or more of silicon, carbon and a current collector onto a copper current collector and allowing the deposited material to dry on the carbon substrate.

Despite the various approaches proposed in the literature, there is no approach to directly use commercially available silica nanoparticles with affordable, economic and environmentally safe treatment methods for fabrication of lithium ion batteries. There remains a need for a solution to prevent the loss in specific capacity due to addition of inactive materials needed to enhance stability. There further remains a need for a method to prepare anode that are stable and provide sufficiently high performance at an acceptable cost.

SUMMARY

In one aspect of the invention there is a provided a method for preparing an electrode comprising:

combining silicon (Si) sulfur doped graphene (SG) and polyacrylonitrile (PAN) to form a slurry, coating the slurry on a current collector and subjecting the coated current collector to a sluggish heat treatment (SHT).

In an embodiment of the method the sluggish heat treatment comprises heating at a rate and to a temperature sufficient to cause cyclization of PAN.

In a further aspect of the invention there is provided an anode prepared by the method comprising:

combining silicon (Si) sulfur doped graphene (SG) and polyacrylonitrile (PAN) to form a slurry, coating the slurry on a current collector and subjecting the coated current collector to a sluggish heat treatment (SHT).

In still a further aspect of the invention there is provided a anode comprising a current collector coated with a composition comprising silicon (Si), sulfur doped graphene (SG) and cyclized polyacrylonitrile (c-PAN).

In a further aspect of the invention there is provided a lithium ion battery comprising at least one cathode and at least one anode wherein the anode is as defined herein.

BRIEF DESCRIPTION OF THE DRAWINGS

Embodiments of the invention will now be described by way of example only with reference to the accompanying drawing wherein.

DETAILED DESCRIPTION

It has been found that electrodes and in particular anodes for lithium ion batteries can be prepared by a method of coating a slurry comprising Silicon (Si), sulfur doped graphite (SG) and polyacrylonitirile (PAN) onto a current collector allowing the coating to dry, followed by heating under conditions of "sluggish heat treatment" (SHT).

Silicon (Si)

The Si may be in the form of Si powder, Si nanowire, Si nanoparticle (SiNP) Si sol particle or Si rod or a combination thereof. Various forms of Si would be known to one of skill in the art and may be used. The Si may be used in various commercially available forms.

Sulfur Doped Graphite (SG)

Figure 1:
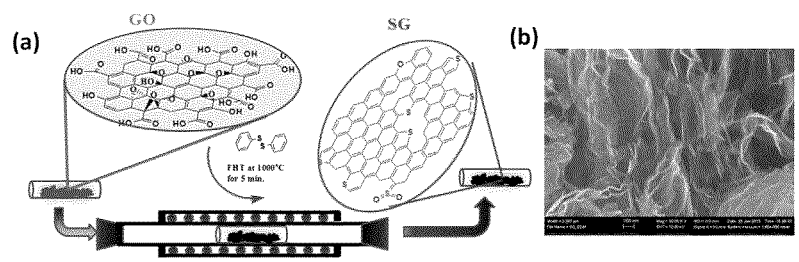
FIG. 1: a) is a schematic of flash thermal shock to convert graphitic oxide (GO) to sulfur-doped graphene (SG) and b) is a scanning electron microscopy (SEM) image of SG.

Sulfur doped graphene can be prepared from graphitic oxide (GO) by a modified Hummer's method.[1-3] In one example 100 mg of GO was mixed with 100 mg of phenyl disulphide by grinding. The materials were then loaded into a tube furnace and kept outside the heating zone until the furnace temperature reached 1000° C. The sample was then slid into the heating zone where it remained for 30 min. under argon protection followed by cooling to room temperature. FIG. 1a is a schematic depicting a flash thermal shock to convert graphitic oxide (GO) into sulfur doped graphene (SG). An SEM image of SG is shown in FIG. 1b. (Graphene without sulfur is used for comparative experiments described herein and was prepared under identical conditions to sulfur doped graphene but without phenyl disulphide.)

Polyacrylonitrile (PAN)

PAN is a synthetic resin prepared by the polymerization of acrylonitrile. It is a hard, rigid thermoplastic material that is resistant to most solvents and chemicals, slow to burn, and of low permeability to gases. Under conditions of sluggish heat treatment (SHT) PAN is converted to cyclized PAN (c-PAN) and becomes conductive. While other conducting agents such as PANI may be used, c-PAN is advantageous in that it is a relatively low cost option. C-PAN formed under condition of SHT in the present method has also been found to be capable of stabilizing a battery in use for more than 200 cycles.

Current Collector

Various current collector materials will be known to one of skill in the art and may be used. In one embodiment the current collector is a copper current collector which may take the form of a Cu grid, Cu foil or Cu foam.

A slurry of Si, SG and PAN can be prepared by a variety of suitable methods which would be known to one of skill in the art. For example, the slurry may be formed by combining the reagents in a solvent. Suitable solvents will be known to one of skill in the art and may include for example one or more of DMF and pyridinium benzylchloride. The mixture may then be subjected to a mixing step. Suitable mixing conditions will be known or may be determined by one of skill in the art and may include ultrasonic radiation or magnetic stirring or a combination thereof. Other suitable methods may include ball milling. In a particular embodiment the reagents are mixed by alternating ultrasonic radiation and magnetic stirring (1 hour each, three times).

The slurry is then coated, cast or deposited on to a current collector. Various methods will be known to one of skill in the art for coating the slurry onto the current collector such as doctor blade, spin coating or screen printing.

The slurry is allowed to dry on the substrate. In a particular embodiment drying may be accelerated by heating in a convention oven at approximately 353K for about 1 hour and then in a vacuum oven at 363 K overnight.

The material is then subjected to SHT. SHT generally refers to a process of slow heating to a peak temperature holding at the peak temperature for a duration of time and slowly cooling. In one embodiment the peak temperature will be in the range of about 300° C. to about 700° C. In a further embodiment the peak temperature is between about 400° C. to about 600° C. In a particular embodiment the peak temperature is about 450° C. to about 550° C., and further embodiments the peak temperature is about 500° C. In one embodiment the rate of heating is about 1 to about 12 degrees Celsius per minute. In a further embodiment the rate of cooling is about 1 to about 12 degrees Celsius per minute. In a further aspect the sluggish heat treatment is conducted under inert gas atmosphere for example under Nitrogen or Argon atmosphere.

An additive may be included to induce or catalyze cyclization of the PAN. In a particular embodiment graphitic oxide (GO) may be included as an additive to induce cyclization of the PAN by oxidation. In a further embodiments Oxidized carbon nanotubes may be used as an additive.

The slurry prepared in the first step of the method includes about 40-70 wt % SiNP, about 15-25 wt % SG, about 15-25 wt % PAN and about 0-5 wt % GO. In one example the slurry includes 60 wt % SiNP, 19 wt % SG, 20 wt % PAN and 1 wt % GO.

EXPERIMENTAL EXAMPLES

Electrode Fabrication

In one example a slurry consisting of 50% of Si—NP, 30% PAN (as a binder), 19% of SG and 1% GO was prepared in DMF. The slurry was mixed under ultrasonic radiation. Then it was coated on Cu foil. The average mass loading of silicon on the electrodes ranged from 0.8-1.5 mg cm$^{-2}$. The electrode was dried in a convention oven at 353 K for 1 hour, followed by drying in a vacuum oven at 363K overnight.

In a further example the slurry was prepared with 60 wt % SiNP, 19 wt % SG, 20 wt % PAN and 1 wt % GO.

In a further example a reference electrode for comparison was prepared with 70 wt % SiNP, and 30 wt % PAN.

In a further example a reference electrode for comparison was prepared use graphene in place of sulfur doped graphene.

Figure 2:
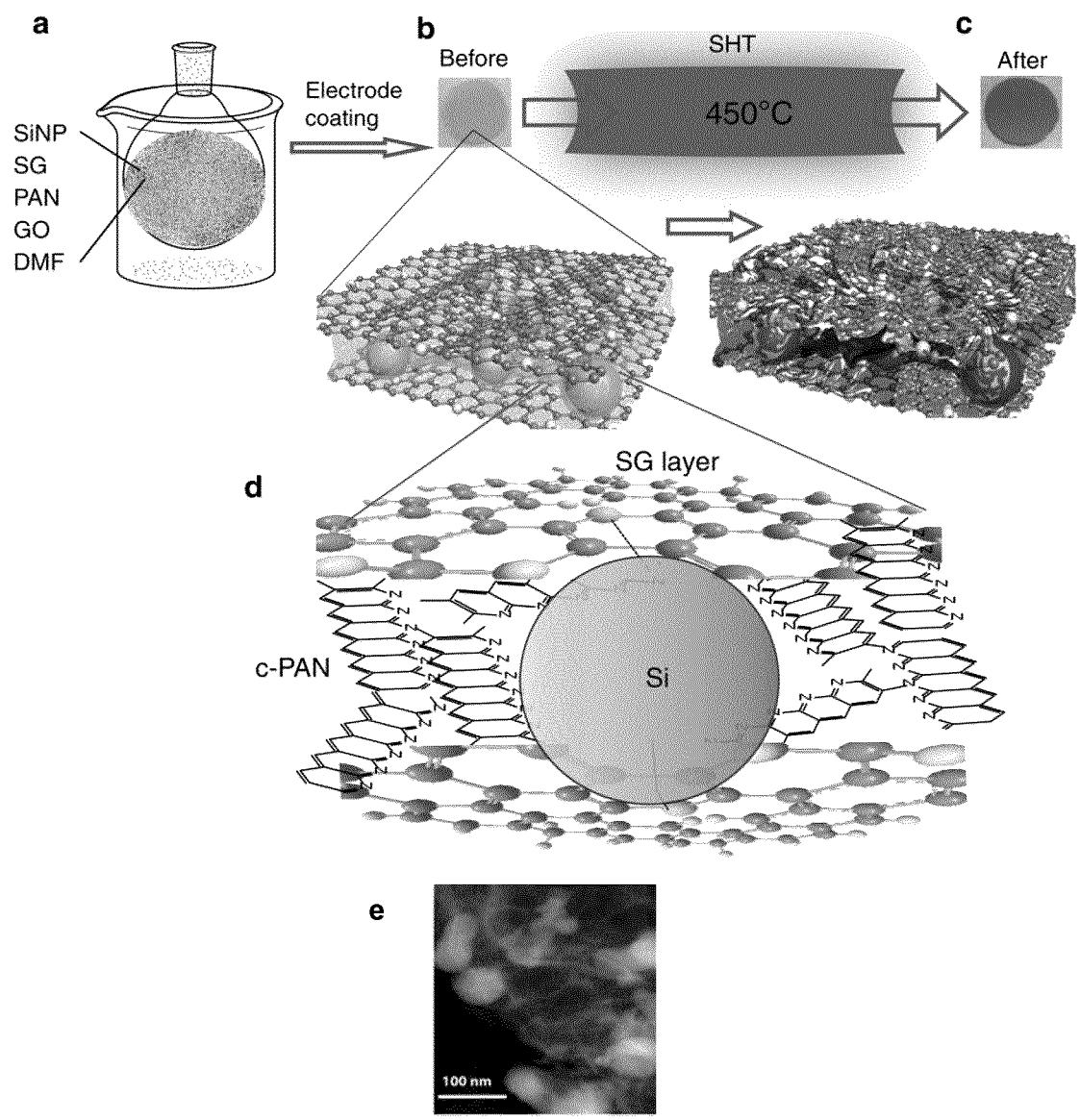
FIG. 2: is a Schematic of electrode process design wherein a) shows components mixing under ultrasonic irradiation b) is an optical image of the as-fabricated electrode made of SiNP, SG and PAN, c) shows the electrode after SHT, d) is a schematic of the atomic scale structure of the electrode and e) is a TEM image of the electrode after SHT.

A schematic of the electrode fabrication process is shown in FIG. 2. Components mixing under ultrasonic irradiation are shown in a). The slurry prepared in a) is coated onto an substrate, typically Cu foil, to provide the as-fabricated electrode of SiNP, SG and PAN as shown in the optical image b and corresponding schematic (schematic of the atomic scale structure is shown as d). The electrode is then treated under sluggish heat treatment (SHT) conditions to provide the material shown in optical image c) and corresponding schematic. A transmission electron microscopy (TEM) image of the electrode of FIG. 2 after SHT is shown in e).

In one embodiment the conditions for SHT include heating to a temperature of about 450° C. over a period of approximately 2 hours then holding the temperature for 10 minutes followed by furnace cooling for approximately 2 hours. The SHT treatment may be performed under inert gas at a flow rate of 100 standard cubic centimeters per minute (SCCM). In one example the inert gas is Argon however other inert gases may be used.

Electrochemical Measurements

In order to test the behavior of SG-Si in realistic full cell setup, a coin cell of SG-Si anode and a commercial LiCoO$_2$ cathode was assembled. The cell was first charged from OCV to 4.3V and then cycled between 2.5 to 4.3 V. The first cycle efficiency is about 84% and the cell was able to give an areal capacity of about 3 mAh cm-2 at a rate of 0.1 Ag-1 with respect to SG-Si mass. When the rate increased 10 times to 1 Ag-1 the capacity decreased to 0.9 mA cm-2 or ~800 mAh g–1 (SG-Si) and remains almost stable with minimum capacity loss for up to 100 cycles.

To test the electrodes, 2032-type coin cells were assembled in an argon filled glovebox using Celgard 2500 membrane as the separator lithium foils as the counter electrodes, 1M LiPF$_6$ in a 3:7 (v/v) mixture of (30 wt %) ethylene carbonate and (60 wt %) dimethyl carbonate with 10 wt % fluorinated ethylene carbonate (FEC) as the electrolyte. The galvanostatic charge/discharge measurements were performed on Neware BTS-CT3008 (Neware Technology, Ltd., Shenzhen, China) at different current densities and different cut-off voltage ranges. Electrochemical impedance spectroscopy measurement was conducted on a Princeton Applied Research VersaSTAT MC potentiostat. The Nyquist plots were recorded potentiostatically by applying an AC voltage of 10 mV amplitude in the frequency range of 0.01 to 100K Hz. All electrochemical measurements were carried out at room temperature.

Material Characterization

The morphologies of the electrode material were imaged using a transmission electron microscopic (TEM, JEOL 2010F TEM/STEM field emission microscope) equipped with a large solid angle for high-X-ray throughput, and a Gatan imaging filter (GIF) for energy filtered imaging. Thermal Gravimetric Analysis (TGA) and Differential Scanning calorimetry (DSC) were measured using TA instrument Q500. The TGA testing was performed in air with a temperature range of 25° C. to 850° C. and a ramp rate of 10° C. min$^{-1}$. Raman spectroscopy were recorded using Bruker Senterra device, applying laser with wavelength of 532 nm.

Quantum Mechanical Computational Method

The DFT calculations were carried out using the Amsterdam Density Functional "ADF" program.[4,5] The electron wave functions were developed on a basis set of numerical atomic orbitals (NAOs) and of Slater type orbitals (STOs). In addition the triple polarization (TZP) basis of Slater-type orbitals was utilized. We used PBE-D3 to perform the calculations[6] where the generalized gradient approximation (GGA) for the exchange and correlation energy terms is used. This explicitly takes into account the dispersion correction. This is a widely used function for catalysis applications and can produce reliable energetics on graphene systems.[7,8]

Morphology and Structure of the Electrode

Figure 3:
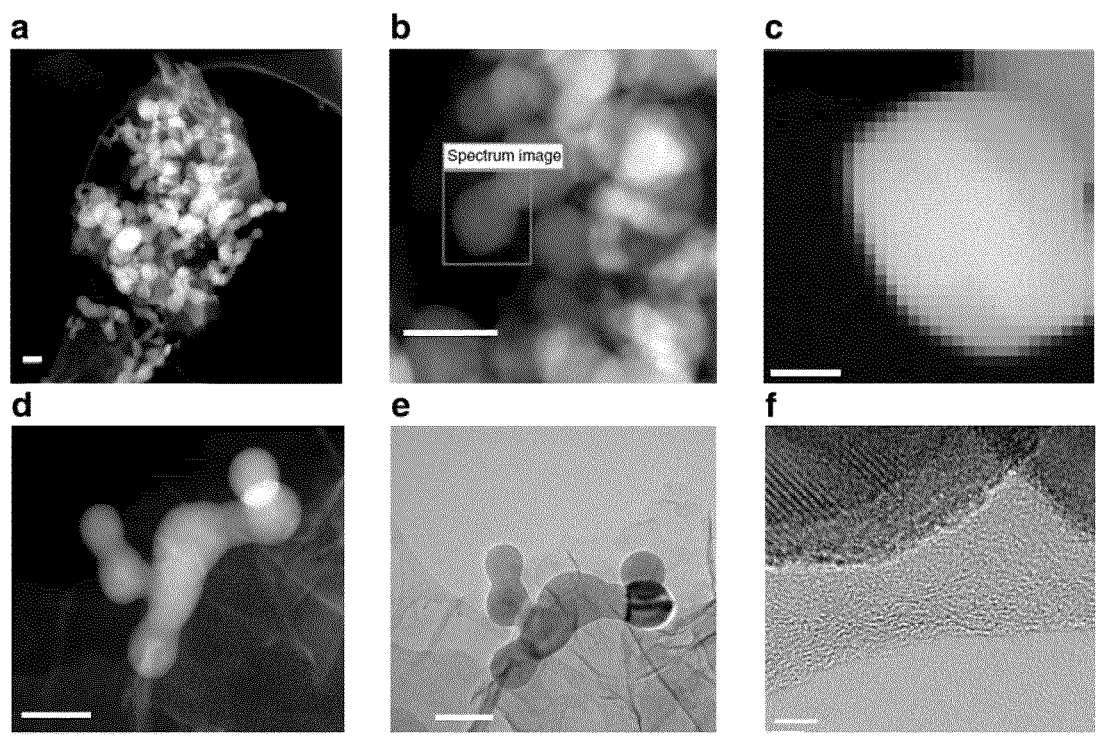
FIG. 3: is a TEM characterization of the electrode a) is a HAADF-STEM image of the SG-Si electrode, b) is a higher magnification HAADF-STEM image of SG-Si, and c) shows EELS mapping of the elements Si and S, with each pixel representing 3.4×3.4 nm, d) HAADF-STEM images zooming in on interconnected SiNPs in the SG-Si electrode, e) is a regular TEM image of the image in d, f) is an HRTEM image of a SiNP with carbon shell and graphene. Scale bars is 100 nm in (a, b, d, and e), 20 nm in (c), and 5 nm in (f)
Figure 4:
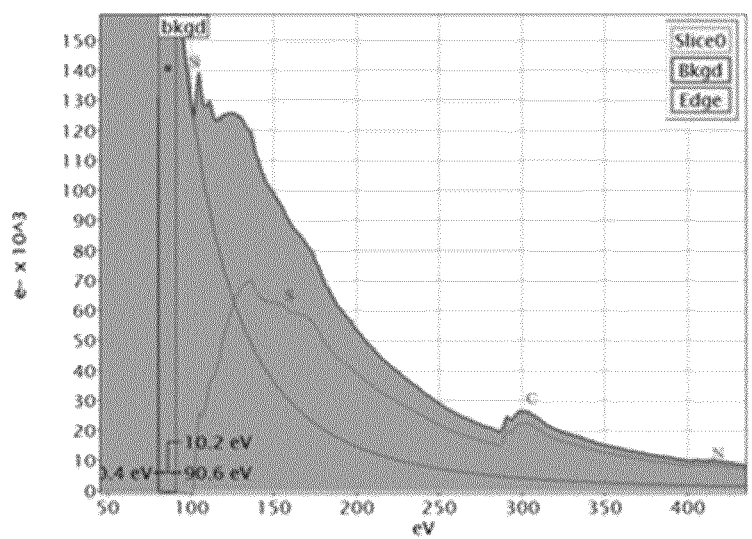
FIG. 4: is an element analysis in electrode showing electron energy loss spectrum for SG-Si electrode after sluggish heat treatment (SHT)

The high angle annular dark field (HAADF) scanning transmission electron microscope (STEM) image in FIG. 3a shows a micron scale cluster in which the SiNP are well wrapped by SG and invariably dispersed within the nanosheets matrix. FIG. 3b displays a higher magnification HAADF-STEM image of the SG-Si electrode, while FIG. 3c displays the corresponding electron energy loss spectroscopy (EELS) image (RBG mixed color mapping) of the highlighted area in FIG. 3b. The pixels in the EELS image correspond to 3.4 nm×3.4 nm each. The yellow color is related to Si, while the red color is sulfur (mixed red and yellow give orange with different degrees relative to the concentration). It can be inferred that sulfur follows the circumference of the SiNP. The corresponding spectrum of the EELS based elemental mapping is shown in the FIG. 4. It, again, confirms the presence of Si, S, N and C, whereby S comes from the SG and N from the cyclized PAN (c-PAN). In order to show how the binder PAN has shelled the particles and connected them, a zoomed HAADF-STEM, with the corresponding TEM, are presented in FIGS. 3d and 3e, respectively. They clearly show that the particles are interconnected and wrapped with graphene. A closer image of HRTEM focusing on one particle (FIG. 3f) shows the crystalline Si particles with a shell of c-PAN and graphene nanosheets.

Figure 5:
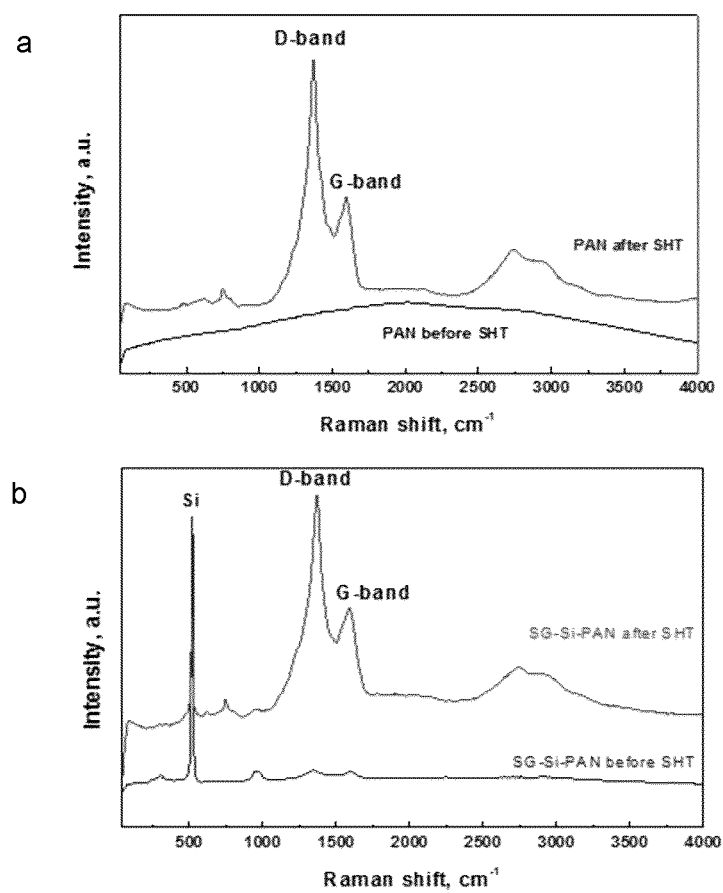
FIG. 5: a) Raman spectra of PAN alone before and after SHT b) Raman spectra of SG-Si-PAN before and after SHT.

Raman spectra of a PAN film deposited on copper foil, then dried, before and after SHT is shown in FIG. 5a. While no features appear before SHT, two characteristic peaks at ~1346 cm$^{-1}$ and ~1605 cm$^{-1}$ are observed after SHT. These peaks correspond to the "D" and "G" bands from the structural defects and disorder from sp$^3$-carbon atoms and the plane vibration of the sp$^2$-carbon atoms in two-dimensional lattice of the c-PAN, respectively. This result again confirms that cyclization of PAN is associated with graphitized carbon. The same features appeared with the electrode materials after subjecting them to SHT, FIG. 5b.

Figure 6:
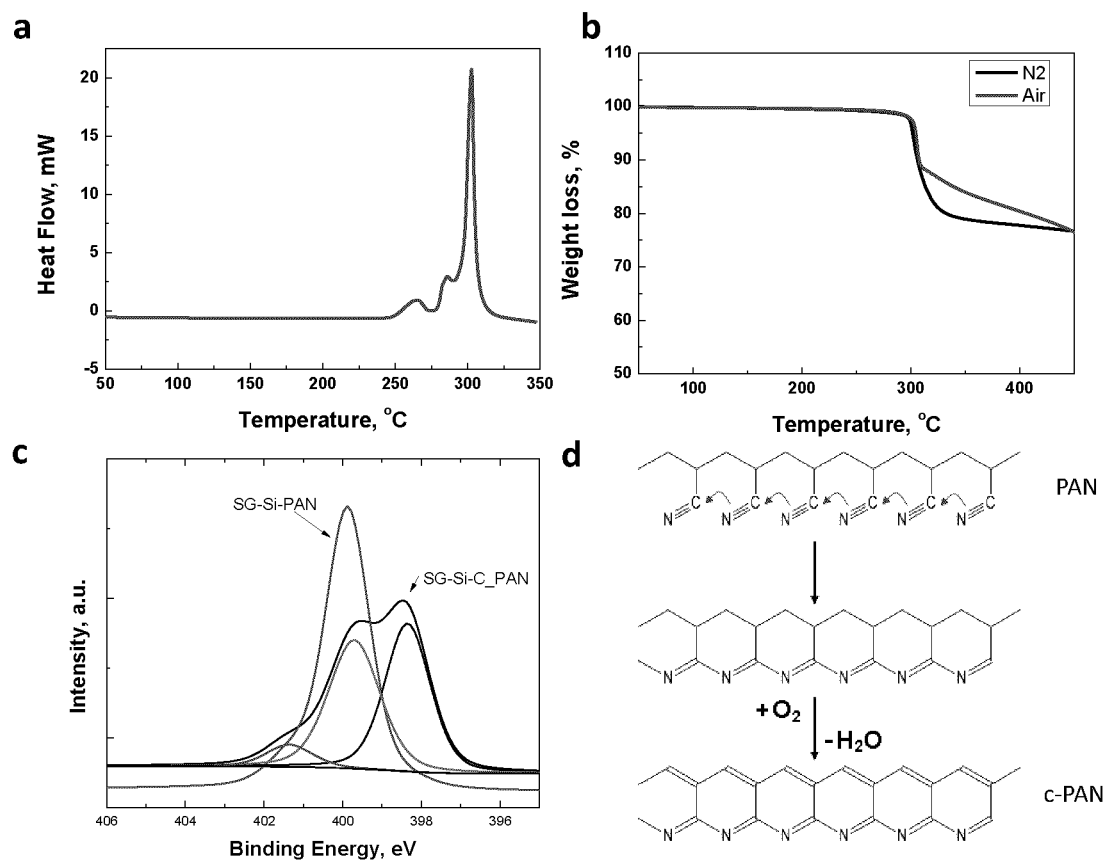
FIG. 6: Shows the structure changes of PAN before and after SHT wherein (a) is a differential scanning calorimetry (DSC) for polyacrylonitrile (PAN) in nitrogen showing a characteristic peak at ~300° C., which corresponds to PAN cyclization (as shown in the proposed schematic (d)); (b) shows a thermogravimetric analysis for PAN in both air and in nitrogen. During cyclization in nitrogen there is more loss in mass which reveals it is more efficient than in air. By cyclization PAN loses ~20% of its mass, (c) Nitrogen high resolution XPS of SG-Si-PAN (before SHT), and SG-Si—C-PAN (after SHT) (d) schematic showing proposed cyclization of PAN.
Figure 7:
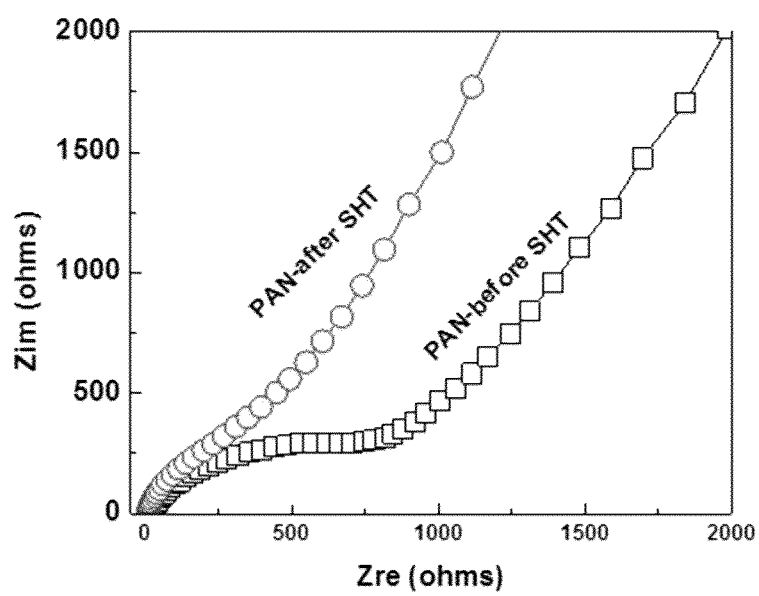
FIG. 7: graph showing electrochemical impedance for a coin cell fabricated using PAN-coated copper foil vs. lithium, (same method of cell testing as described herein below) showing that both the electrode series resistance and the charge transfer resistance have been decreased after the sluggish heat treatment.
Figure 8:
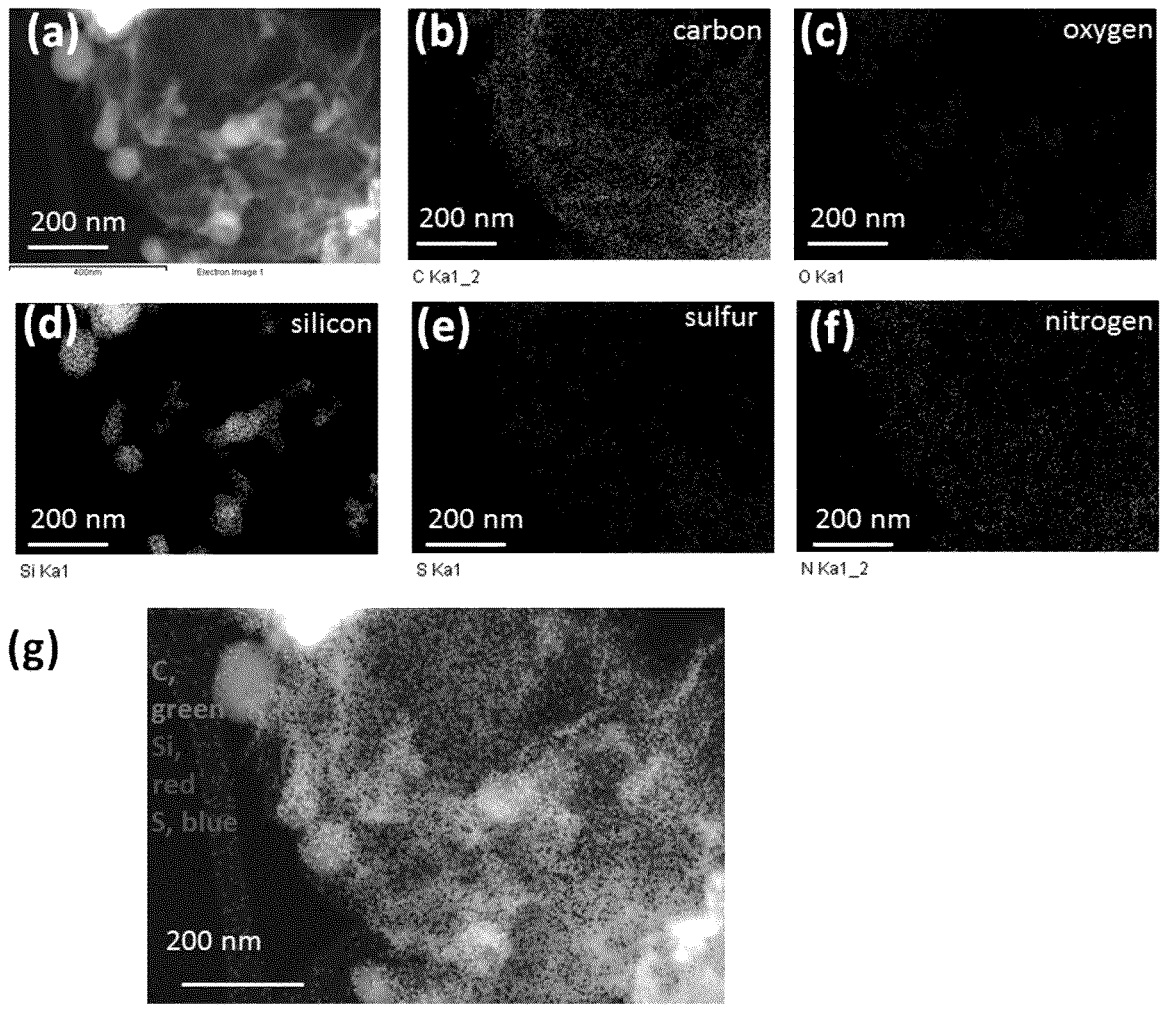
FIG. 8: Morphology of the electrode (a) is a TEM image of SG-Si electrode material, (b-f) show the corresponding EDX mapping of the elements carbon, oxygen, silicon, sulfur, and nitrogen, respectively, and (g) overlaid map of carbon, silicon, and sulfur.

It is well established that sluggish heating can cyclize PAN,[9,10] whereby c-PAN can provide stabilization of electrode structures. A small proportion of graphitic oxide (GO), ~1%, may be added as an oxidizing agent to promote cyclization of PAN. The characteristic exothermic peak for PAN cyclization is shown by differential scanning calorimetry (DSC) in the FIG. 6a, with the results consistent with previous reports.[11,12] Upon treatment, PAN loses about 20% of its mass as shown by TGA, with results provided in FIG. 6b. The SHT treatment has modified the chemical structure of the PAN causing cyclization. The cyclization process is associated with changes in the nature of chemical binding of nitrogen with an evidence of enriched pyridinic type nitrogen, as shown by the XPS results presented in FIG. 6c with a shift of binding energy of nitrogen from 399.88 to 398.38 eV.[13,14] After cyclization, PAN has a π-conjugate structure that is believed to lower the electronic and charge transfer resistances of the electrode, as evidenced by the electrochemical impedance spectroscopy shown in FIG. 7. After inspecting the HRTEM images introduced in FIG. 3 and the EDX mapping in FIG. 8, it can be proposed that, almost every SiNP is caged in a carbon shell of c-PAN. It is also clearly observed that there is no agglomeration of SiNP.

X-Ray Photoelectron Spectroscopy

Figure 9:
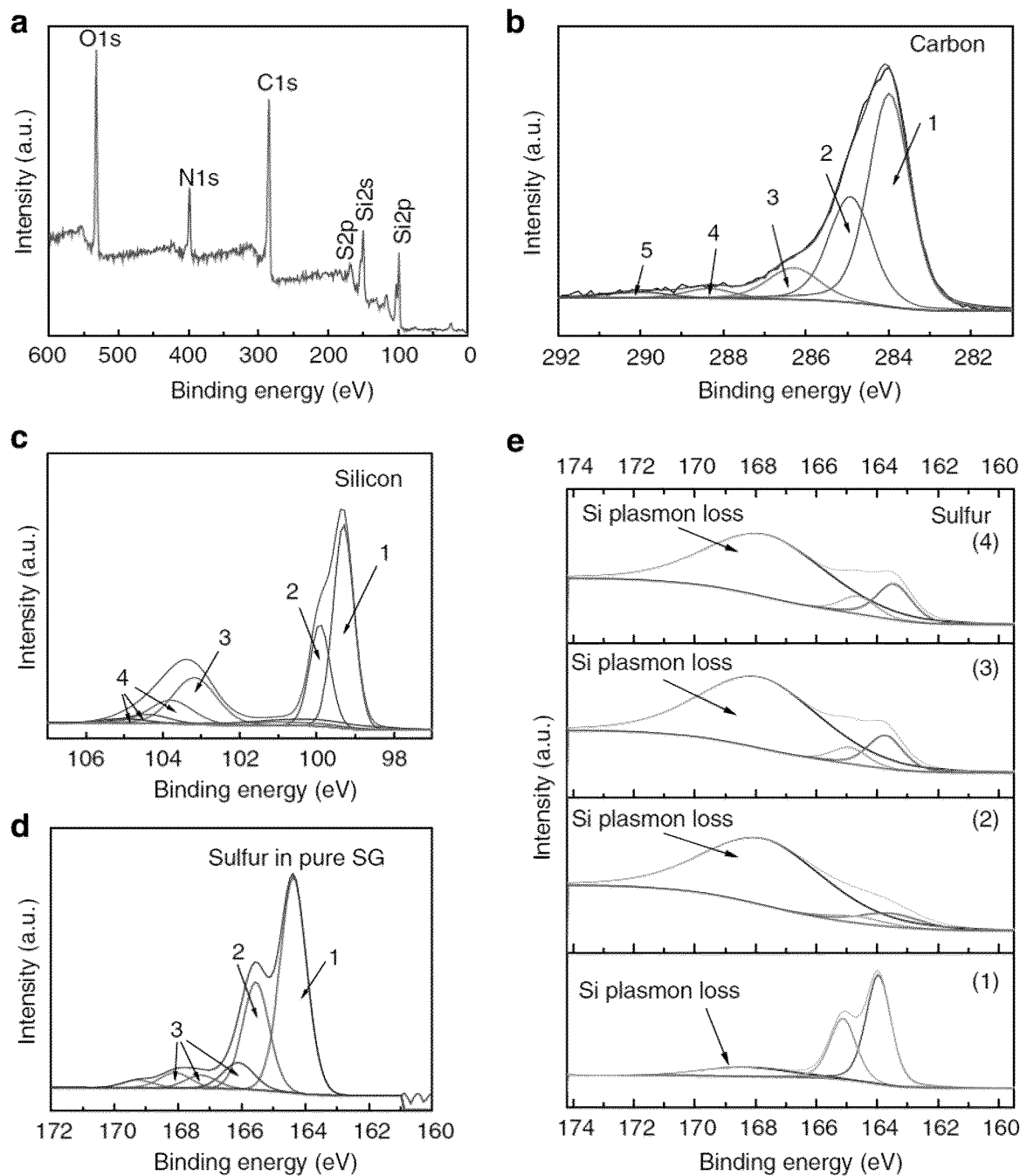
FIG. 9: Electrode material characterization for SG-Si a) is an XPS survey spectra confirming the elements Si, S, C, N and O, b) is a high-resolution XPS spectra of carbon in SG-Si, c) is a high resolution XPS of Si 2p in SG-Si, d) is a high-resolution XPS spectra of sulfur in pure SG, e) is a high resolution XPS of sulfur in 1) electrode material made of elemental S, SiNP and PAN, 2) electrode material of (1) after being subjected to SHT, 3) electrode material made of SG, SiNP and PAN, and 4) electrode material of (3) after being subjected to SHT. (au arbitrary unit)
Figure 10:
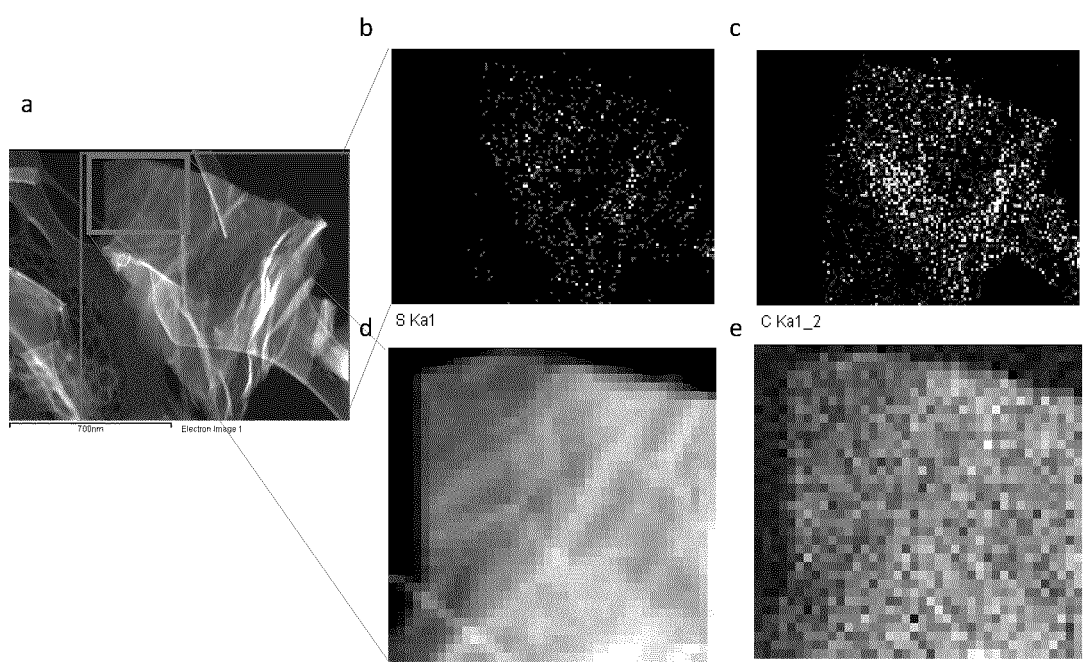
FIG. 10: Sulfur distribution on SG nanosheet (a) is an STEM-HAADF of a SG nanosheet in a micron size, (b) and (c) are the EDX mapping for sulfur and carbon, respectively; (d) is the electron energy loss spectroscopy (EELS) mapping and (e) represent the EELS mapping of sulfur in pixilated grey color, each pixel represent 10×10 nm. The figure clearly shows the doping with sulfur in the bulk of SG nanosheet as well as on the edges.
Figure 11:
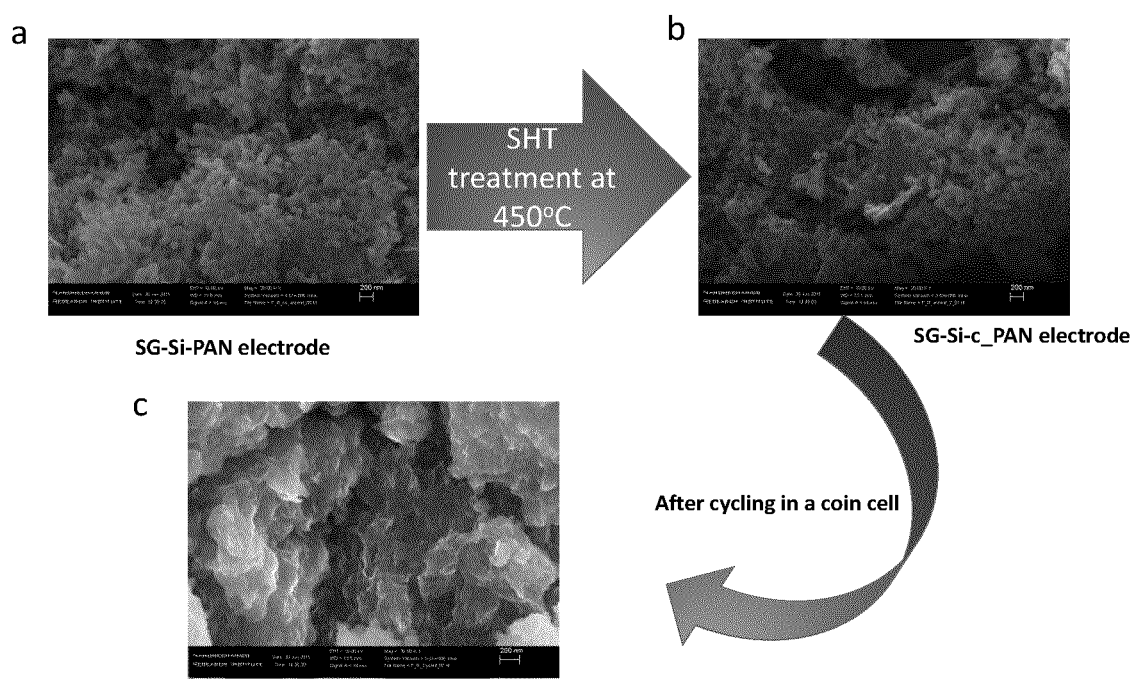
FIG. 11: Morphology of SG-Si-PAN electrode (a) shows the as-prepared electrode after drying, (b) shows the electrode after sluggish heat treatment, and (c) shows the electrode extracted from a coin cell which was cycled for 100 cycles.
Figure 12:
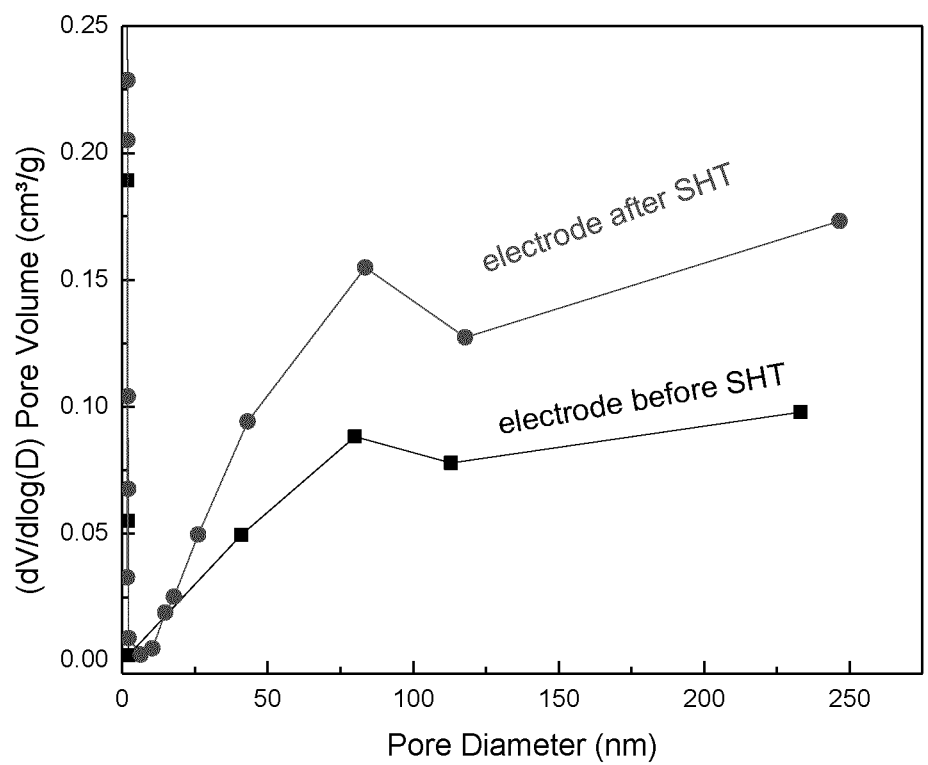
FIG. 12: Porosity in the electrode is shown by comparison of pore size distribution for the SG-Si electrode before and after SHT. The pore volume increases after SHT which provide void space that compensate the volume expansion of Si during lithiation.

The elemental analysis of the electrode material after being subjected to SHT is determined by the XPS survey spectrum as shown in FIG. 9a, confirming the existence of Si (40%), S (5%), C (40%), N (11%) and O (4%), with all compositions given in wt %. It should be pointed out that XPS provides high surface sensitivity with analysis depth of about 8-10 nm. Therefore, this elemental quantification is different from the expected values which estimate Si as 60% and S as ~0.5%. The spectra of C in FIG. 9b shows several common peaks, the first one (1) centered at 284 eV corresponds to $sp^2$ hybridized graphitic type carbon. Peak (2), centered at 284.8 eV, denotes the presence of $sp^3$ bonded carbon. Finally, peaks (3) and (4) are characteristic of oxygenated carbon and peak (5) is related to Plasmon loss features.[15-17] The core-level spectra in FIG. 9c shows the typical elemental Si peak (1) located at 99.4 eV, with the minor peaks at higher binding energies (~103.4 eV) related to oxygenated silicon or silicon bonded to sulfur.[18] FIG. 9d shows the core-level spectra of S in pure SG, with the atomic % of S of ~2.5%. The $S_{2p}$ doublet corresponding to the sulfide (C—S—C) structure is observed at 164.0 and 165.2 eV and labeled (1) and (2). These peak locations are in good agreement with the reported $S_{2p3/2}$ and $S_{2p1/2}$ spin orbit couplet.[19,1,2] The other minor peaks labeled as (3) in FIG. 9d and located at higher binding energies are attributed to oxygen bound to sulfur (—SOx).[20] The structure elucidation of SG using XPS were used as the base to determine the basic SG cluster used for DFT calculations discussed vide infra. It is important to note that sulfur doped the graphene sheets homogeneously, both on the edges and in the basal planes. This was evidenced by STEM-EDX and EELS mapping shown in. A set of samples were prepared as shown below and analysed in order to understand the covalent chemisorbed interactions that occur between Si and S in SG. The four samples prepared are: (1) Elemental sulfur microparticles, SiNP and PAN dispersed well in DMF, followed by solvent removal; (2) Sample 1 annealed at 450° C. (same as the SHT process); (3) SG+PAN+SiNP, dispersed well in DMF, followed by solvent removal; and (4) Sample 3 annealed at 450° C. (same as the SHT process). High resolution XPS spectra for all of these samples was obtained and is shown in FIG. 9e. Sample 1 shows the regular S2p orbital split (doublet at 163.98 and 165.08 eV). Additionally, a very depressed broad peak is observed at average 168 eV which may be attributed to silicon loss Plasmon resonance.[21,22] Plasmon loss peaks involve a strong probability for loss of a quanta of energy due to electron interaction with the photoelectron.[23] For Sample 2, some sulfur is covalently interacting with silicon while the majority of sulfur is lost after annealing due to sublimation (m.p. ~120° C.). The XPS results correspondingly show a greatly enhanced peak signal for the silicon loss Plasmon resonance. SG instead of elemental sulfur was used in Samples 3 and 4. The XPS signals for both these samples also showed a strong peak for silicon loss Plasmon resonance, indicating possible interactions between the Si and S atoms even before the annealing process. This feature did not change with annealing, indicating a similarly strong interaction between the two elements in both cases. While not wishing to be bound by theory, it is speculated that the reason of the enhanced Plasmon loss which appeared in samples 2-4 is attributed to the interaction of Si with S. The morphology investigated by SEM and pore size distribution investigated by BET were determined for the electrode before and after the SHT process, shown in FIGS. 11 and 12, respectively. The micron sized particles of SiNP dispersed on the sheets of SG and capped with c-PAN are demonstrated. The results of BET analysis also show that the electrode structure developed increased nanoporosity through the SHT process.

Electrochemical Performance.

Figure 13:
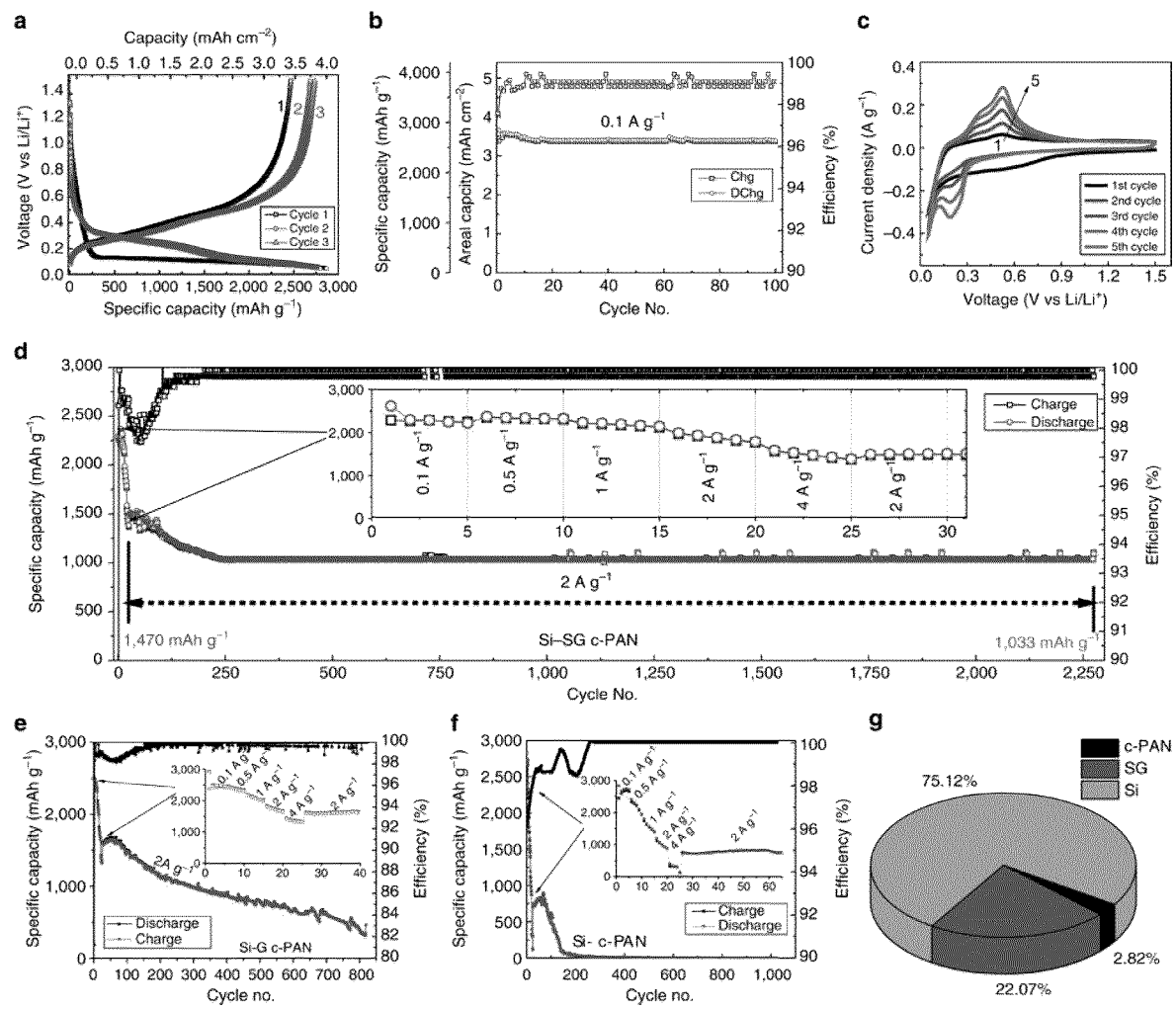
FIG. 13: Electrochemical performance of SG-Si a) shows the voltage profile of SG-Si anode at 0.1 A $g^{-1}$, b) The corresponding cycle stability, c) cyclic voltammogram curves of the SG-Si coin cell, d) rate capability of SG-Si anode followed by cycle stability at 2$Ag^{-1}$, e) rate capability of G-Si anode followed by cycle stability at 2$Ag^{-1}$, f) rate capability of Si-PAN anode followed by cycle stability at 2$Ag^{-1}$, and g) a pie chart showing the relative contribution of the electrode materials for the capacity seen in (d); h) is a graph showing the voltage profile for a full cell battery based on SG-Si anode and $LiCoO_2$ cathode, and i) is a graph showing the corresponding cycle stability at 1 Ag-1 with respect to SG-Si, the inset is the first 5 cycles at 0.1$Ag^{-1}$.
Figure 13:
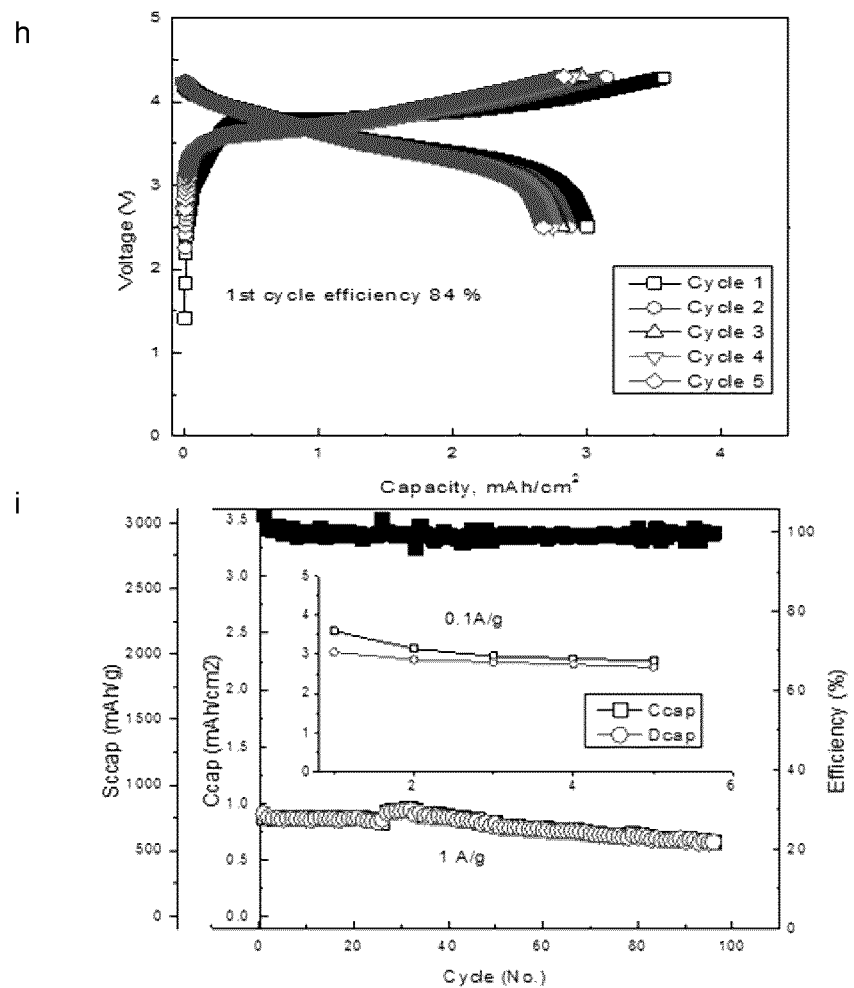
Figure 14:
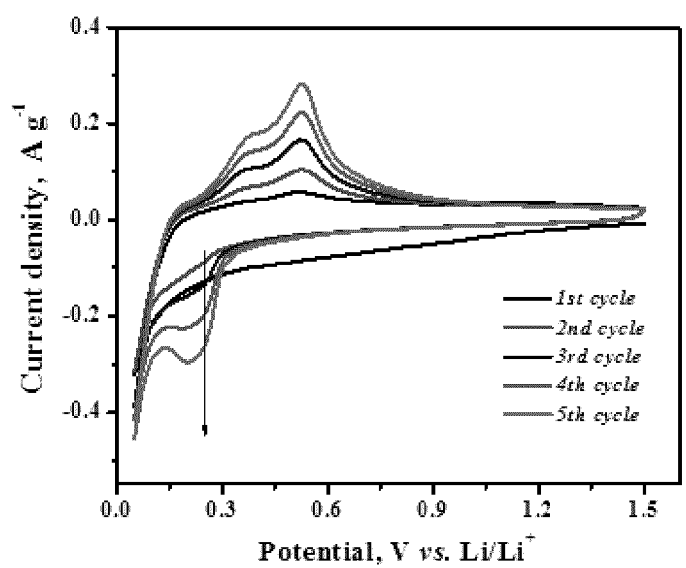
FIG. 14: Cyclic voltammogram curves of G-Si anode material in coin cell.
Figure 15:
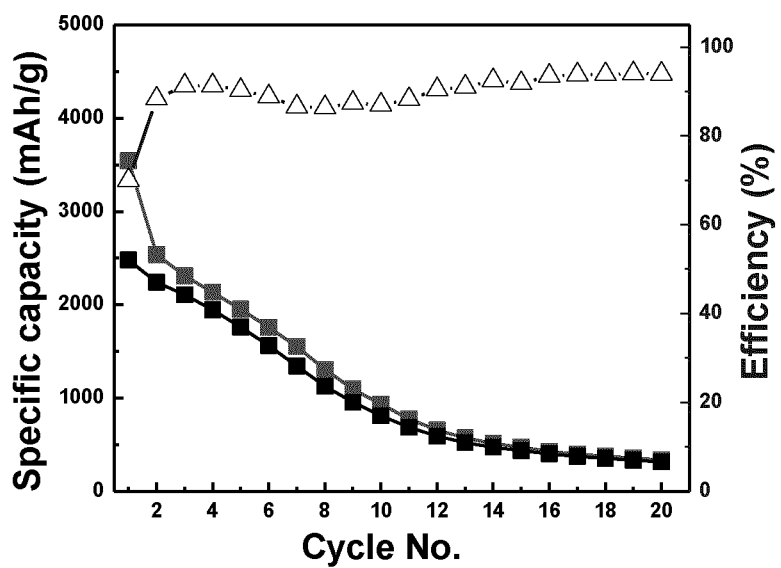
FIG. 15: Cycle stability of a reference cell was demonstrated using a cell fabricated using SiNP (60%), PVDF (polyvinylidene fluoride) (20%) as binder, and super P (20%) as conducting carbon, the performance was tested at 0.1$Ag^{-1}$.
Figure 16:
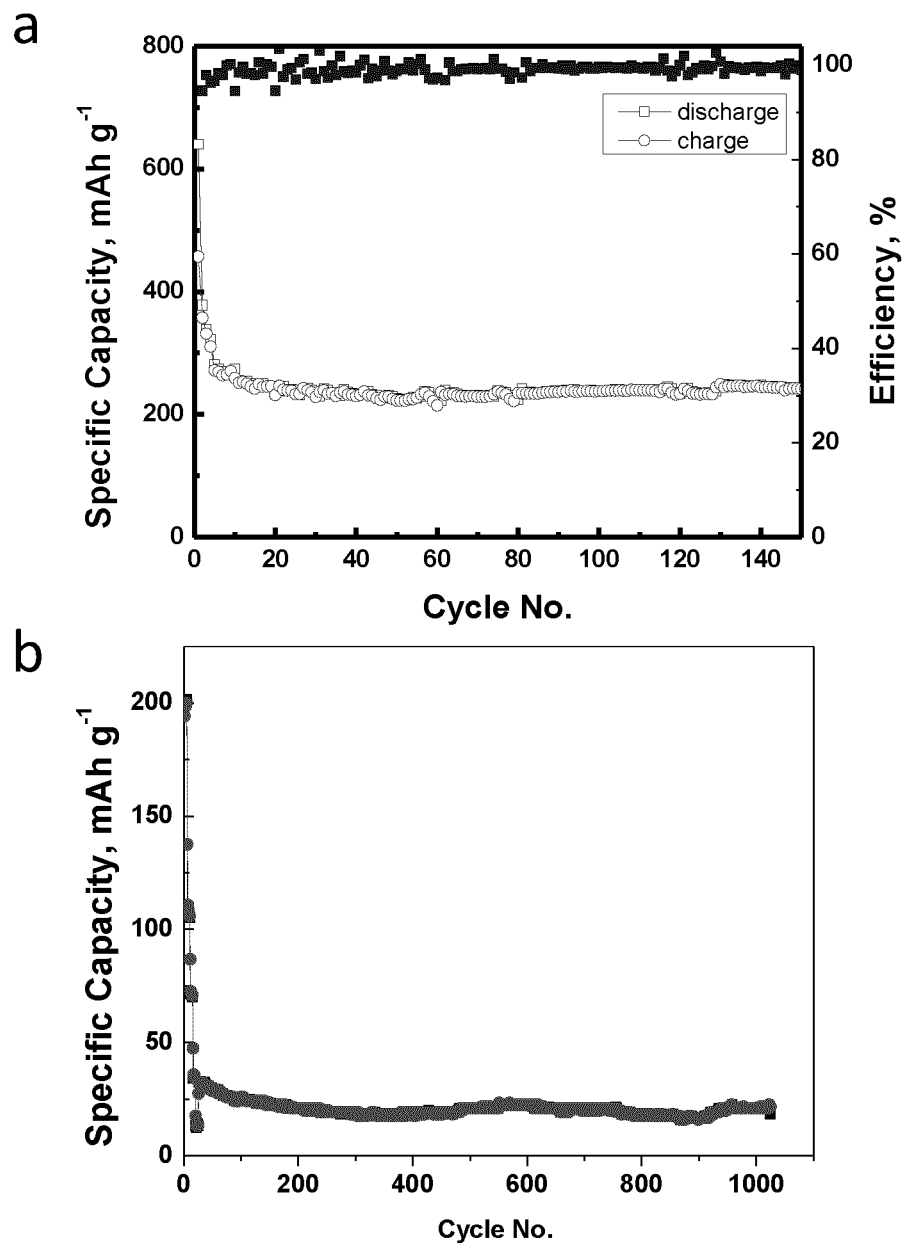
FIG. 16: Reference battery testing (a) SG-PAN, and (b) only c-PAN, after being subjected to SHT treatment. The cells were tested at 0.1 A $g^{-1}$ then continued at 2 A $g^{-1}$. The SG-PAN provided reversible capacity of ~250 mAh $g^{-1}$ and the c-PAN provide ~25 mAh $g^{-1}$.
Figure 17:
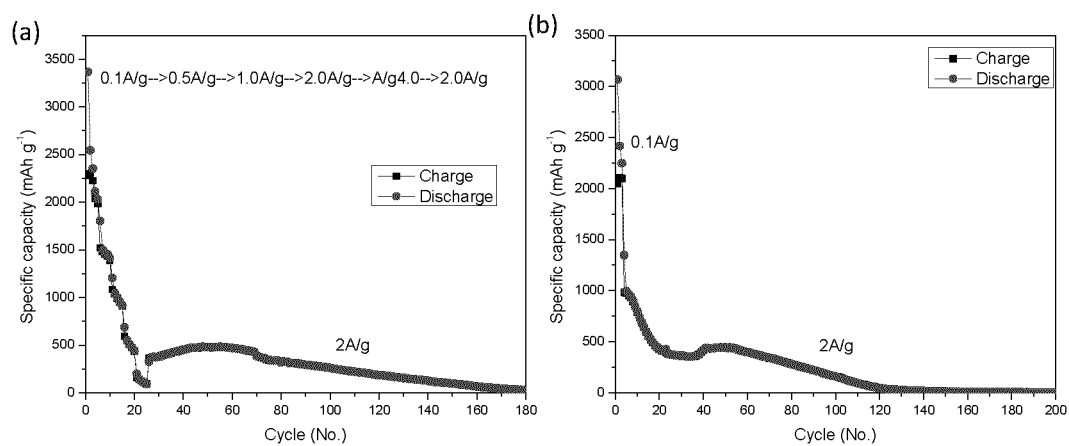
FIG. 17: Cycling performance for reference batteries. These were fabricated using SG+SiNP+PVDF with no SHT treatment. (a) The cell subjected to rate capability at different current then continued at 2 A $g^{-1}$ (b) The cell was tested at 0.1 A $g^{-1}$ for 5 cycles then continued at 2 A $g^{-1}$ for the rest.
Figure 18:
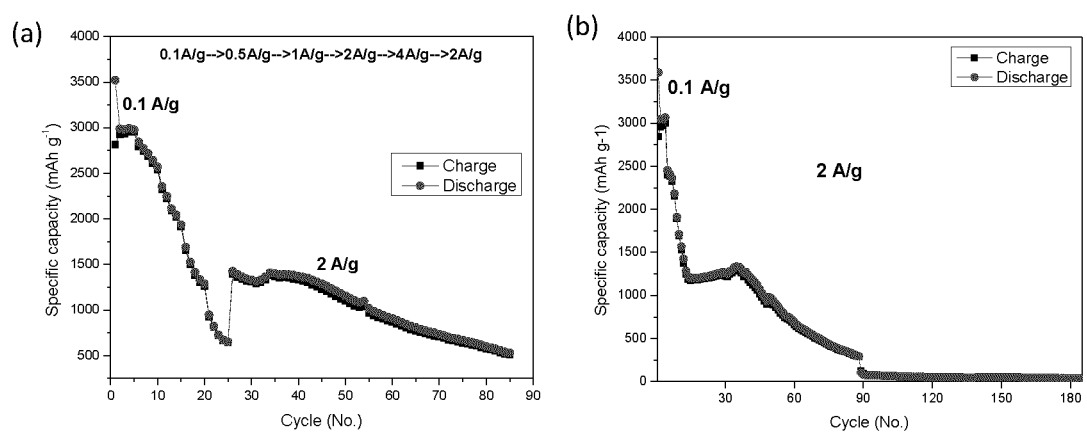
FIG. 18: Cycling performance for reference batteries. These were fabricated using SiNP+Graphene oxide+PAN with SHT treatment. (a) The cell subjected to rate capability at different current then continued at 2 A $g^{-1}$. (b) The cell was tested at 0.1 A $g^{-1}$ for 5 cycles then continued at 2 A $g^{-1}$ for the rest.

FIG. 13a presents the typical galvanostatic charge/discharge profiles of the SG-Si based electrode tested at 0.1 A $g^{-1}$ between 1.5 and 0.05 V. The observed plateau in the first discharge curve represents alloying of crystalline silicon with lithium.[24,25] The SG-Si delivers an initial discharge capacity of 2865 mAh $g^{-1}$, based on all masses of SG, c-PAN and Si, with a high first cycle Coulombic efficiency of 86.2%. If not mentioned, all reported capacities are based on the total mass of SG, c-PAN and Si. The voltage profiles of the subsequent cycles show slightly different behaviour, which is common for the lithiation process of amorphous Si formed during the first cycle. It is noteworthy that the areal charge capacity is about 3.35 mAh $cm^{-2}$, which is close to the performance targets for next generation high energy dense lithium ion batteries.[26] FIG. 13b shows the cycling stability of the SG-Si at 0.1 A $g^{-1}$. A stable cyclability up to 100 cycles can be obtained, with an average capacity of 2750 mAh $g^{-1}$ (~3.35 mAh $cm^{-2}$). The average capacity relative to the mass of Si was determined as 3360 mAh$g^{-1}$ (~3.5 mAh $cm^{-2}$). The charge storage behavior was also characterized by cyclic voltammetry (CV). FIG. 13c shows the first 5 cycles of the SG-Si electrode in a coin cell at a scan rate of 0.05 mV $s^{-1}$. In the cathodic scan, there are two distinctive peaks appearing at 0.27 and 0.22 V vs Li/Li$^+$, indicating the formation of $Li_{12}Si_7$ and $Li_{15}Si_4$ phases, respectively.[27,28] In the anodic direction, the corresponding two peaks are located at 0.31 and 0.49 V, representing the dealloying of $Li_xSi$ to Si. All anodic and cathodic peaks become broader and stronger as a result of cycling, which is a common feature attributed to the conversion of Si into an amorphous phase during lithiation/delithiation. Similar features were observed for a G-Si investigated for comparison as shown in FIG. 14. The rate capability of the SG-Si electrode is shown in FIG. 13d, revealing the excellent kinetics of the SG-Si electrode at different currents up to 4 A$g^{-1}$, Moreover, the robust structure enables a very stable cycling, where a capacity of ca.1033 mAh $g^{-1}$ can be maintained for 2275 cycles at a rate of 2 A$g^{-1}$. By comparison, a similar electrode structure prepared by replacing SG with non-doped graphene gives an inferior rate capability and cycling stability, as shown in FIG. 13e. The high capacity of the G-Si persists only for 80 cycles, then fades gradually, reaching ~400 mAh g$^{-1}$ after 800 cycles. Such a capacity fading is mainly attributed to the degradation of the Si structure, where the expansion and shrinkage of SiNP during cycling leads to the separation from graphene scaffold, and subsequent loss of conductivity and instability in the solid electrolyte interphase (SEI) structure. The significantly different electrochemical performances put a spotlight on the important role of sulfur in binding the SiNP to the surface of SG, which encouraged us to further investigate it using density functional theory (DFT) calculations discussed below. As a reference, a coin cell made of a SiNP/PAN electrode, fabricated using SiNP and PAN subjected to a SHT, also shows poor rate performance. In addition, its cycle stability persists for only 65 cycles and then degrades rapidly to almost zero capacity (FIG. 13f). These results emphasize the important role of the covalent binding between Si and SG to enable the impressive performance. In all cases, SG-Si, G-Si, and even just Si when fabricated using PAN and followed by our SHT treatment persists for at least for 2275, 80, and 65 cycles, respectively. On the other hand, a coin cell fabricated using the same SiNP (60%), Super P (20%), and the traditional binder polyvinylidene fluoride (PVDF) (20%) without any SHT treatment has degraded very rapidly, as shown in FIG. 15. Since we considered the total mass of the electrode during calculation of the capacity, it is important to show the relative contribution of each of the electrode components. FIG. 13g is a pie chart showing the relative percent contribution of the capacity observed in FIG. 13d. The results is based on the battery performance testing for SG, under similar conditions, which shows average reversible capacity of 235 mAh g$^{-1}$, and an electrode coated with only PAN after SHT treatment, which gave an average capacity of 18 mAh g$^{-1}$ (see FIGS. 16a and 16b). To investigate the specific role of cyclized PAN and SG, reference cells were fabricated from SG-Si-PVDF and GO-Si-PAN, respectively. The battery performance of these two cells decayed rapidly as shown in FIG. 17 and FIG. 18. This emphasizes the synergy of the SG-Si-c-PAN in enhancing the electrode stability and providing stable cycling.

Figure 19:
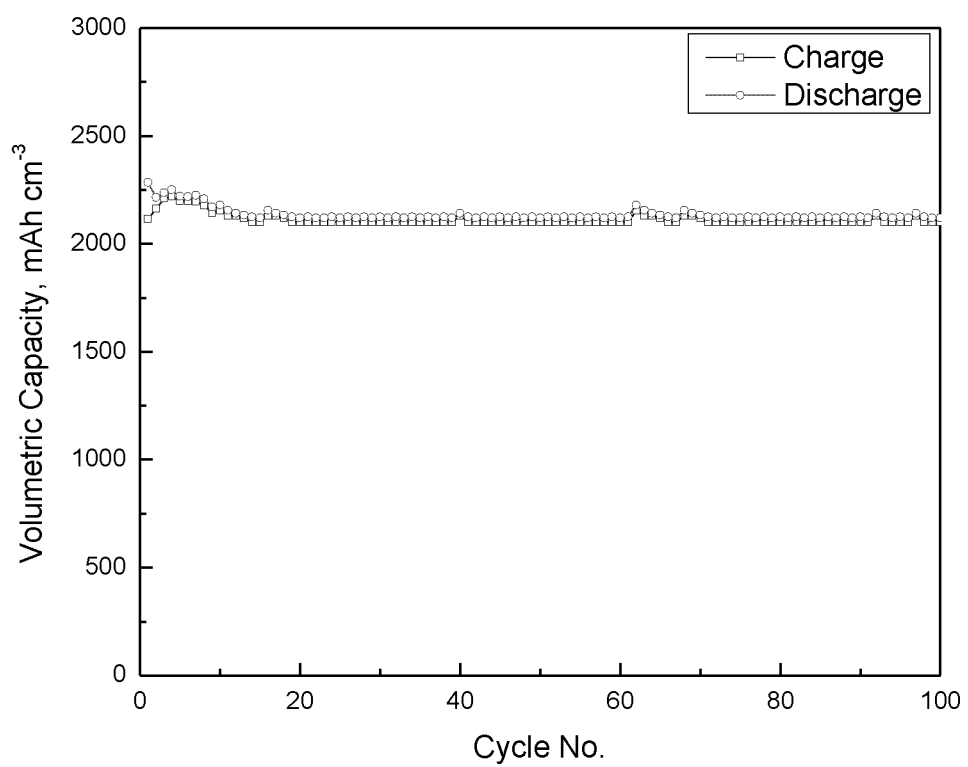
FIG. 19: Volumetric Capacity for SG-Si-c-PAN electrode for the cell performance with data shown in FIG. 5b.
Figure 20:
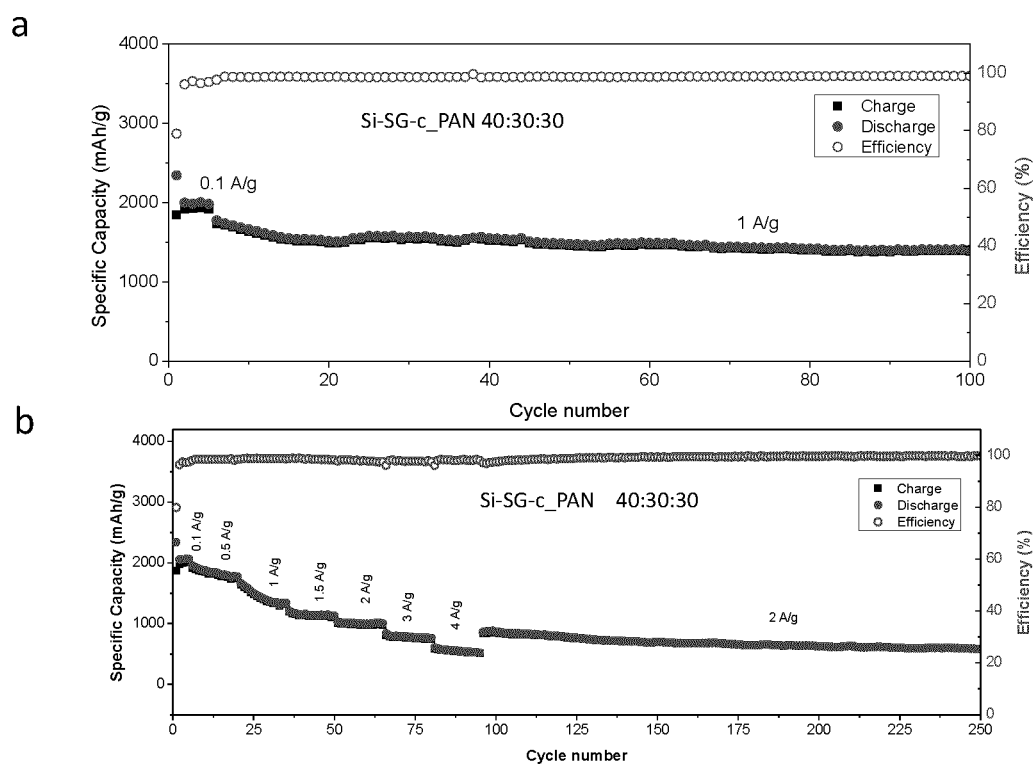
FIG. 20: Further battery performance for SG-Si-c-PAN electrode with ratio of 40:30:30, respectively. (a) shows the cell cycled at 0.1 A $g^{-1}$ for conditioning then continued at 1 A $g^{-1}$. (b) The cell started conditioning cycles then continued with rate capability at different currents then continued cycling at 2 A $g^{-1}$. The capacity measured here is per mass of silicon and SG.

The volumetric capacity for the cell presented in FIG. 13b was calculated and the result was plotted in FIG. 19. It reveals that the SG-Si-c-PAN electrode is able to provide a reversible capacity of ~2350 mAh cm$^{-3}$ for up to 100 cycles. Coin cells fabricated using different electrode composition of 40:30:30 (Si-SG-PAN) were tested and the results were introduced in FIG. 20. It reveals similar trend of stable cycling and improved rate capability.

Figure 21:
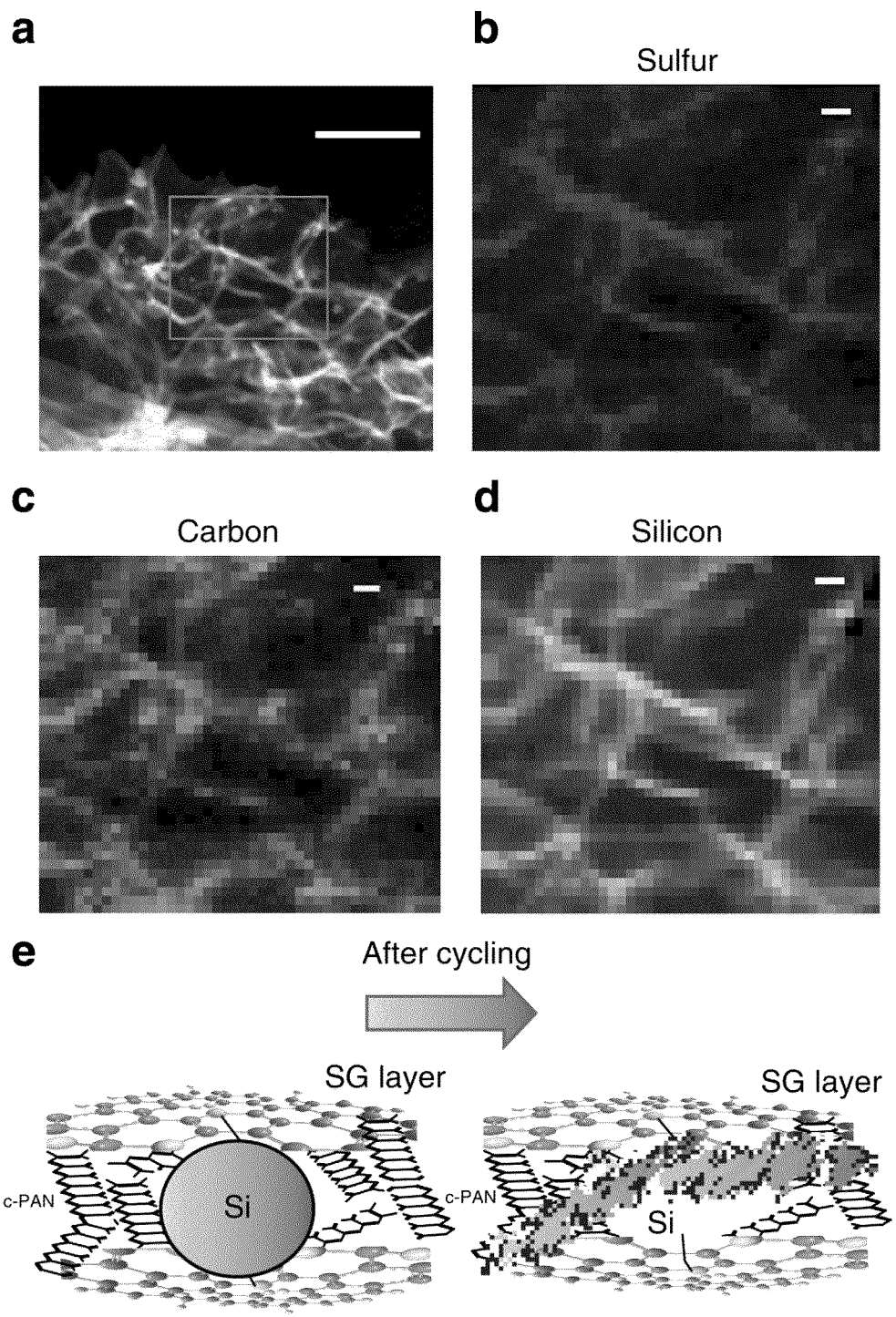
FIG. 21: Characterization of SG-Si electrode material after cycling for 2250 cycles. a) HAADF-STEM image of the SG-Si electrode after cycling, b-d) the elements mapping by EELS for the area marked in image. Scale bar in (a) is 100 nm, and in (b-d) is 10 nm. Each pixel in Figs b-d represents 3.4×3.4 nm. (e) A schematic to explain the structure change in the electrode before and after cycling. Before battery cycling SiNP are dispersed, and bond with S on surface of SG with c-PAN further connect the SiNP with SG. After battery cycling, the SiNP change to amorphous structure and spread and confine in the crinkles of SG; f) image of SG-Si electrode before cycling.
Figure 21:
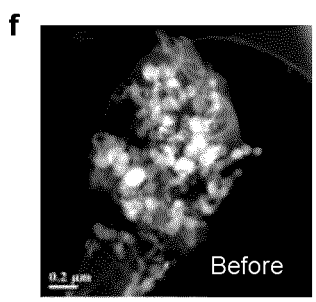
Figure 22:
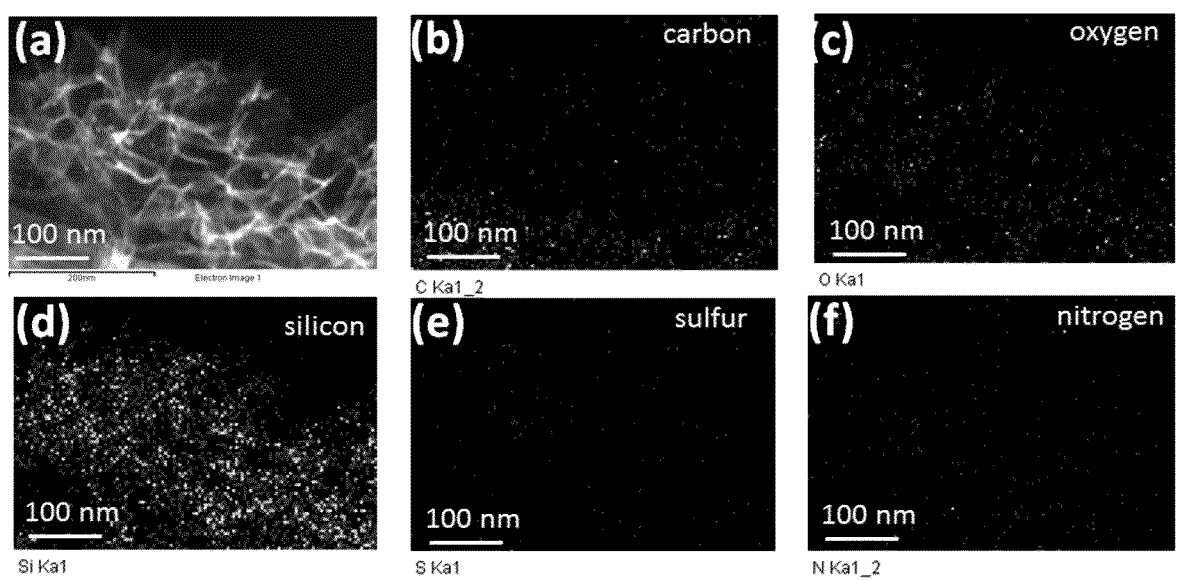
FIG. 22: After cycling characterization of SG-Si. (a) STEM image of SG-Si electrode material after being cycled for 2275 cycles of charge discharge, b-f) the corresponding EDX mapping of the elements carbon, oxygen, silicon, sulfur, and nitrogen, respectively.
Figure 23:
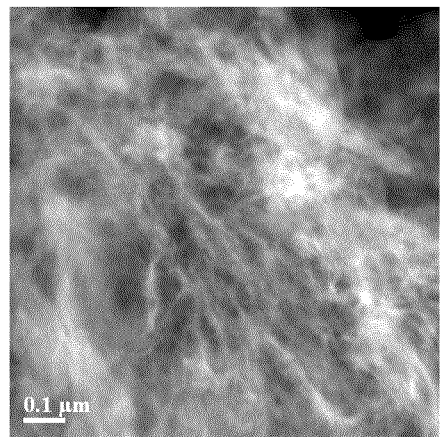
FIG. 23: After cycling characterization of G-Si. The figure shows HAADF-STEM image of the G-Si electrode after cycling for 800 cycles as shown in FIG. 5e, it shows the agglomeration of Si which explains the capacity fading.

After cycling a coin cell for 2275 cycles (FIG. 13d), the cell was disassembled and the SG-Si electrode was subjected to further characterization. FIG. 21a shows a HAADF-STEM image of the electrode structure and FIGS. 21b-d provide the corresponding colored EELS mapping for the elements S, C, and Si, respectively (each pixel is 3.4×3.4 nm). This characterization shows that the Si, as a result of frequent cycling, is confined in the wrinkles of SG, and capped with cyclized PAN, utilizing the covalent interaction between Si, SG and N. The location of the SiNP is associated with regions of high sulfur and carbon. It is clear that the engineered nano-architecture of the electrode design along with the covalent interaction occurring between Si an SG, prevented agglomeration of Si and maintained stable reversible cycle stability for 2275 cycles. The same electrode was mapped using EDX for comparison and the result was presented in FIG. 22. It is important to emphasize here that EELS provides a near atomic scale resolution to depict the distribution of atoms throughout the sample. EELS also has a high sensitivity for lighter elements, explaining why the signals from both carbon and sulfur are clearly distinguished. FIG. 21e presents conceptual design of the electrode structure before and after frequent cycles of continuous lithiation/delithiation. On the other hand, inspection of the electrode of the cell based on G-Si-cPAN after being cycled under the same conditions shown in FIG. 13e by STEM reveals that by continuous cycling silicon reveals more agglomeration, FIG. 23. This emphasizes the important role of SG, which prevents agglomeration of silicon and maintains electrode stability over a large number of cycles.

Density Functional Theory Calculations

Figure 24:
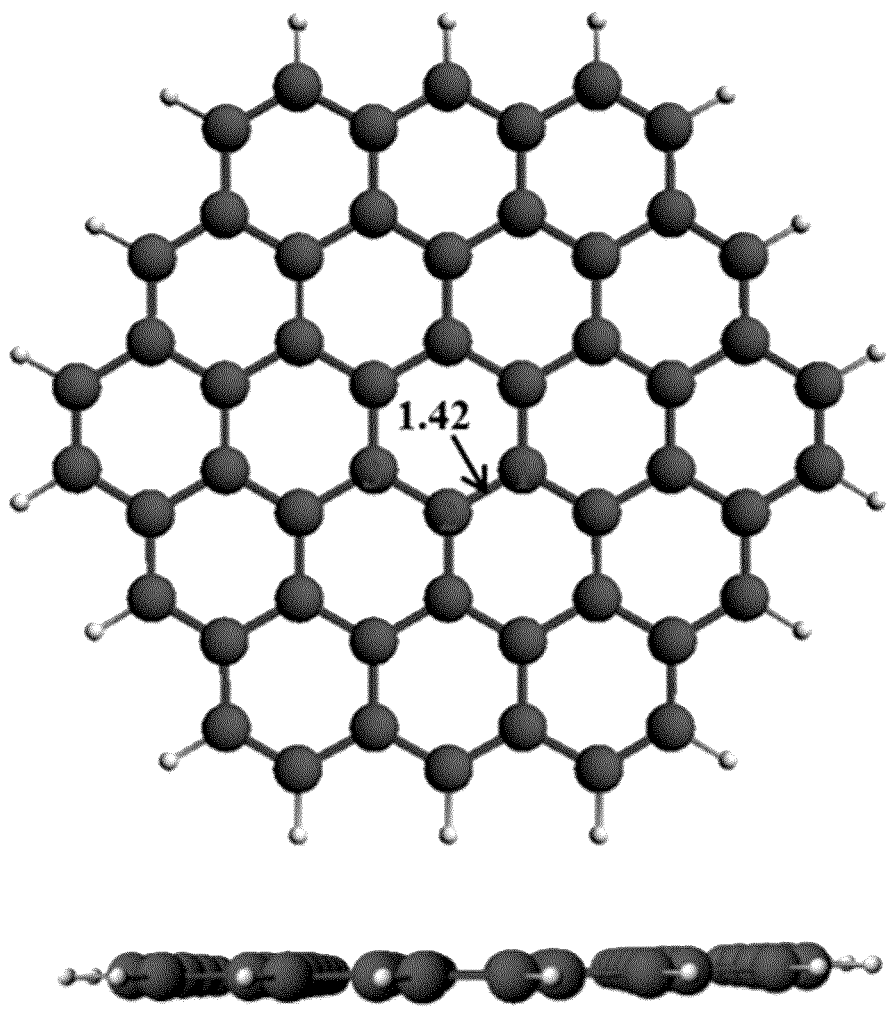
FIG. 24: The optimized geometry of H passivated graphene (G). Top view (top) and side view (bottom). C atoms are colored grey, H atoms white. Bond length is in angstrom.
Figure 25:
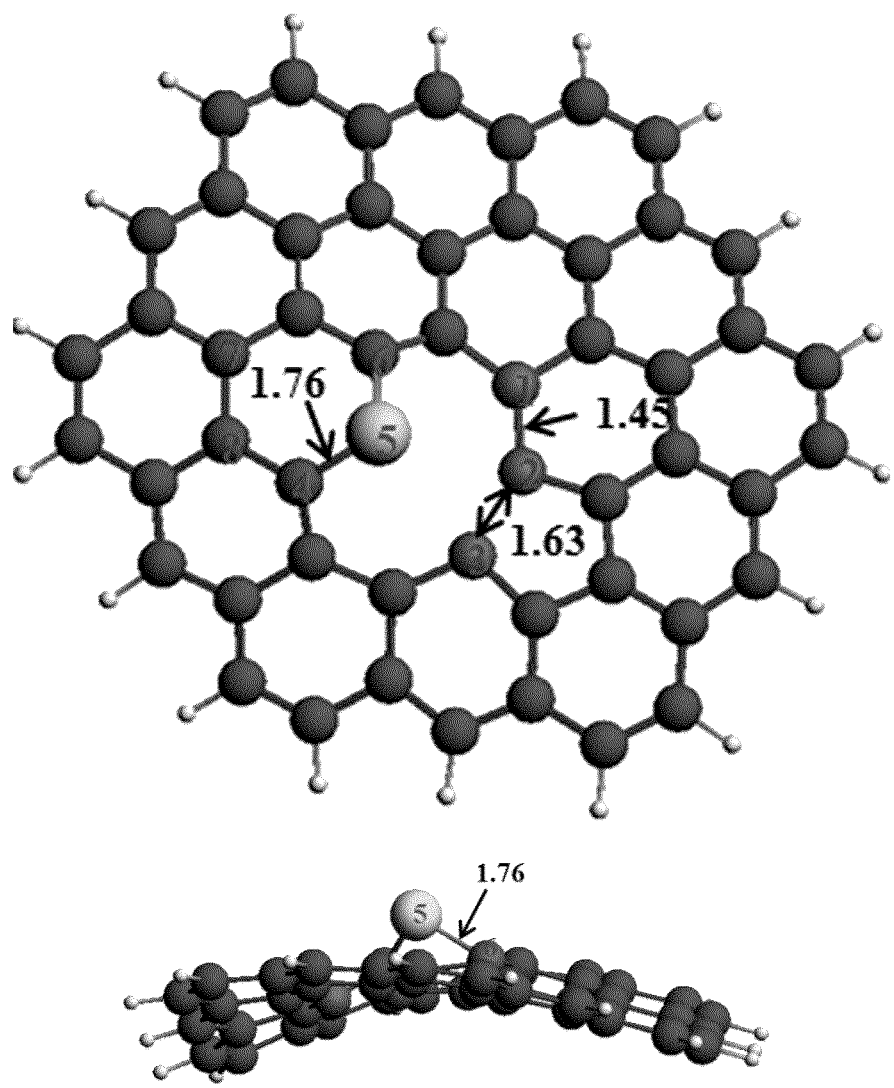
FIG. 25: The optimized geometry of sulfur-doped graphene (S-G). top view (top) and side view (bottom). C atoms are colored grey, H atoms are white, S atom is yellow. Bond lengths are in angstrom.

The graphene surface was modeled using a hydrogenated graphene cluster ($C_{54}H_{18}$), which is also referred to as H passivated graphene (see FIG. 24). The optimized bonding distances of C—C (1.42 Å) and C—H (1.09 Å) in this model are in good agreement with that for bulk graphite.[29] Based on this H passivated $C_{54}H_{18}$ cluster, and based on bonding configuration elucidated by XPS presented in FIG. 9d, a structure of sulfur-doped graphene (SG) is proposed. The optimized SG structure with some key structural parameters is shown in FIG. 25. It can be seen that the SG has a distorted configuration. In all the calculations, all the atoms in the cluster were allowed to relax.

In order to describe the interactions between the Si and graphene, the bonding energies (BE) of Si were defined by equation (1):

$$BE = E_{Si\text{-}graphene} - E_{graphene} - E_{Si} \qquad (1)$$

where $E_{Si\text{-}graphene}$, $E_{Si}$, and $E_{graphene}$ represent the energies of the Si-bound to the graphene structure, the Si atom, and the graphene structure, respectively.

Figure 26:
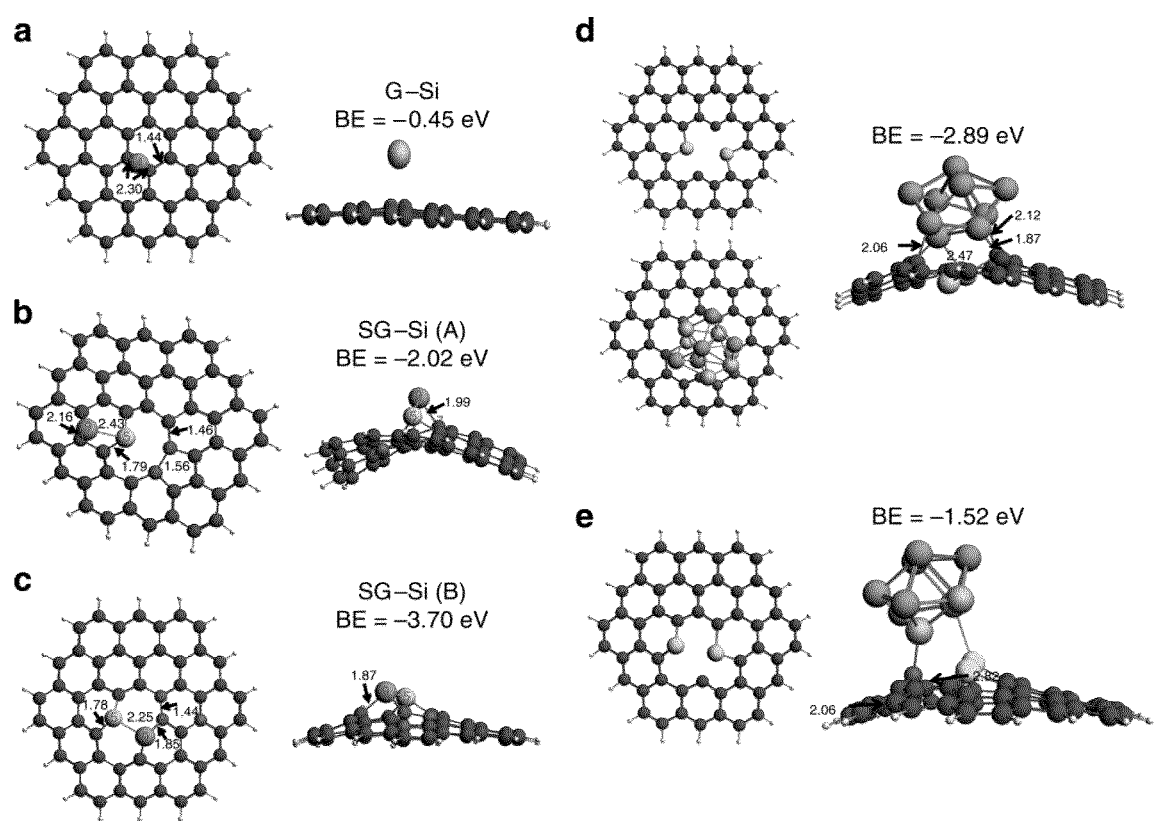
FIG. 26: DFT quantum calculations for G-Si and SG-Si systems. Geometries and binding energy (BE) of the stable Si adsorption configurations on a): graphene, referred as G-Si; b) and c) on sulfur doped graphene, referred as SG-Si(A) and SG-Si(B), respectively, C atoms are colored grey, H atoms white, S atom yellow, Si atom brown. Some of the important atoms were labeled, and they correspond to the atoms in Table 1, and d and e) The DFT calculated binding energy (BE) of the stable cluster of 9 Si atoms adsorption configurations to SG with different defect configurations. The bond lengths shown in the figure are in angstroms.
Figure 27:
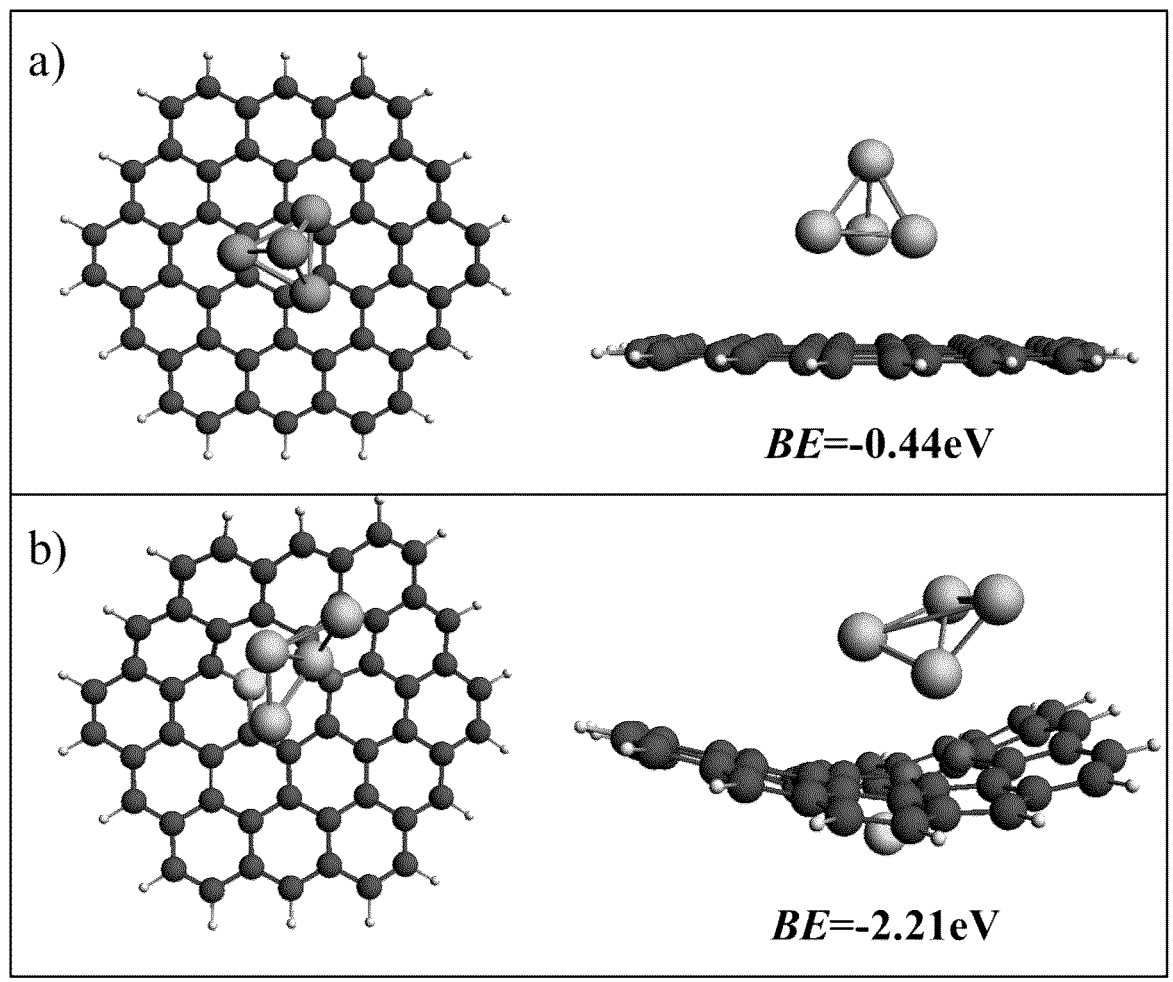
FIG. 27: Geometries and bonding energy (BE) of the stable $Si_4$ cluster adsorption configurations. (a) On graphene, (b) On sulfur doped graphene. C atoms are colored grey, H atoms are white, S atom are light grey, Si atoms are grey.

Si adsorption on different sites of the SG was studied. The results are compared with those obtained on undoped graphene. FIG. 26a presents the configuration of the stable Si adsorption on graphene (G-Si), with Si sitting at the bridge site with adsorption energy of 0.45 eV. Two stable configurations for Si adsorption on sulfur doped graphene were observed. The first is represented as SG-Si(A), which reveal the bonding of Si to location (A), FIG. 26b. The second represents binding to location (B) and represented as SG-Si (B), FIG. 26c. In SG-Si(A), Si was found to bind to S and two "saturated" C atoms ($C_7$ and $C_8$), with the corresponding binding energy of −2.02 eV. On the other hand, at the second position, SG-Si(B), Si binds to S and two C's at the defect sites ($C_2$ and $C_3$) forming two Si—C and one Si—S bonds, leading to a binding energy of −3.70 eV. The higher binding energy in the latter case indicates Si would be more energetically favorable to bind to the defect $C_2$ and $C_3$ atoms. The results show that Si attached on SG structure has a much higher binding energy than that on graphene (G-Si). This result provides a possible explanation for the much longer cycle stability in SG-Si than in G-Si. The binding energy of silicon cluster made of 9 silicon atoms to different defect configuration in SG, FIGS. 26d and e, was also studied. As expected, the covalent interaction occurs between only two of the silicon atoms in the cluster adjacent to the S and defect in SG. The binding energy was found to be dependent on the defect configuration. FIG. 27 shows the binding configuration with smaller cluster of 4 Si atoms. The same cluster binds to SG stronger than binding to defect free graphene.

Hirshfeld charge analysis was also conducted to evaluate the stability of Si on G and SG. The calculated charge distribution before and after the Si adsorption on G and SG are given in Table 1. The results show that Si has a positive charge after its adsorption on G and SG, which indicates that there are electrons flow from the Si atom to the graphene substrate upon Si adsorption. However, the electron flow is more significant for Si adsorption on SG than that on G, because Si deposited on SG has a larger positive charge than that on G. Table 1 also shows that the C atoms that are bonded with the Si atom in SG-Si, such as $C_7$ and $C_8$ in SG-Si(A), $C_2$ and $C_3$ in SG-Si(B), have more negative charges than in G-Si ($C_2$ and $C_3$). These observations suggest that the bonding between Si and SG is stronger than that on G, providing further support for the stability of Si on SG.

TABLE 1

Hirshfeld charges distribution before and after Si adsorption. The charge was calculated for the indicated atoms on graphene (G) and sulfur doped graphene (SG), atoms labeling are indicated in FIG. 15 and 16.

| Atoms | Si adsorption on G | | Si adsorption on SG | | |
|---|---|---|---|---|---|
| | G | G-Si | SG | SG-Si(A) | SG-Si(B) |
| $C_1$ | −0.001 | −0.004 | 0.010 | −0.006 | −0.004 |
| $C_2$ | −0.001 | −0.028 | 0.003 | −0.022 | −0.113 |
| $C_3$ | −0.001 | −0.029 | 0.004 | −0.013 | −0.100 |
| $C_4$ (or $Si_4$) | | 0.120 | −0.016 | −0.001 | −0.019 |
| $S_5$ | | | 0.093 | 0.214 | 0.206 |
| $C_6$ | | | −0.016 | −0.035 | −0.024 |
| $C_7$ | | | −0.003 | −0.070 | −0.013 |
| $C_8$ | | | −0.009 | −0.028 | −0.006 |
| $Si_9$ | | | | 0.190 | 0.145 |

Figure 28:
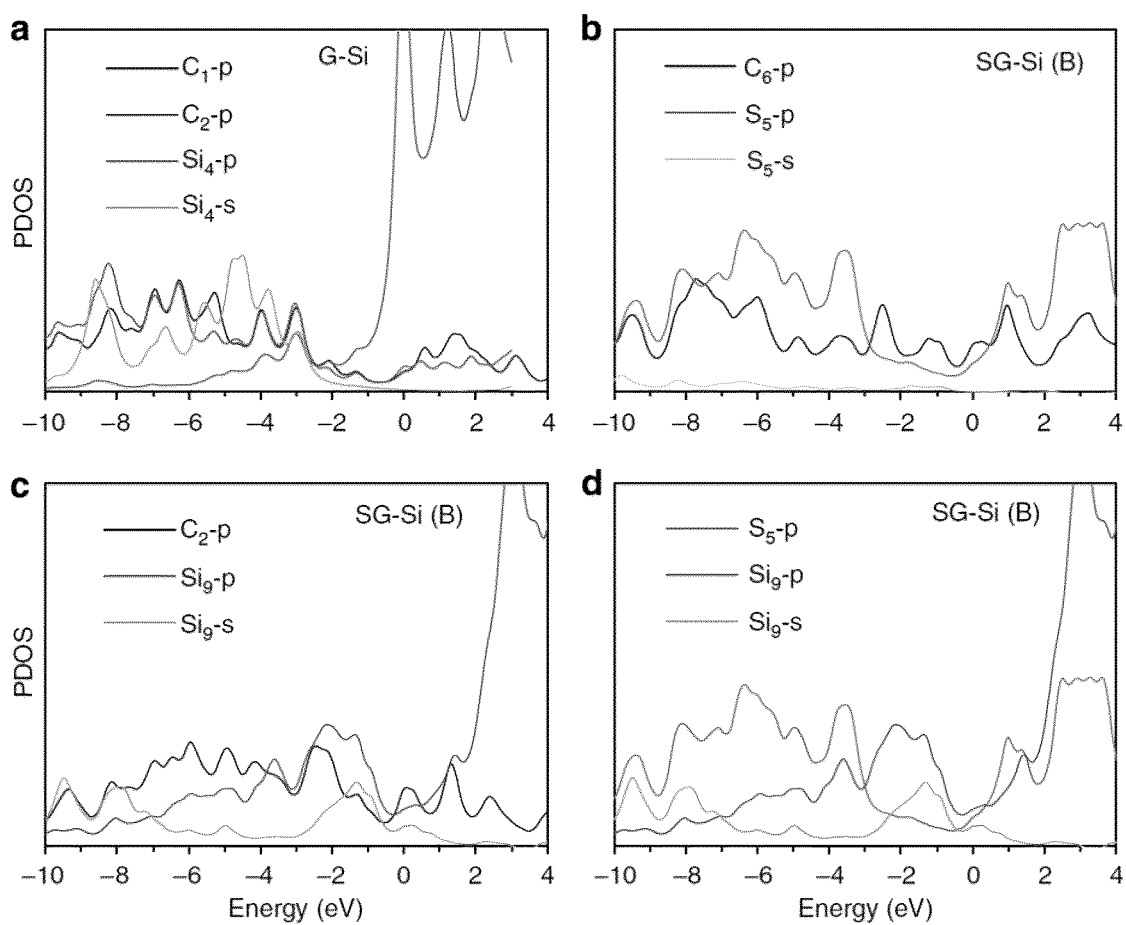
FIG. 28: Projected density of states (PDOS). The PDOS for Si atom and the individual C atoms involved in a) Si adsorption on graphene, G-Si, and (b-d) Si adsorption on sulfur doped graphene, SG-Si(B)

To better understand the covalent synergy between Si and graphene substrates, the projected density of states (PDOS) of the Si atom over G and SG were calculated, based on the electron structure and bonding. As shown in FIG. 28a, there is a harmonic 2p-2p overlaps between the $C_1$-2p and $C_2$-2p states at the whole energy level (from 0 to −10 eV) in SG, showing the strong interaction between the two C atoms. However, for Si and C, the harmonic overlap occurs only between $Si_4$-2p and $C_2$-2p at a narrow energy level (−2~−4 eV), indicating a weak interaction between $Si_4$ and $C_1$ atom. For SG-Si (B), a large overlap between the $C_6$-2p and $S_5$-2p state was observed (see FIG. 28b), indicating a strong S—C bonding. FIG. 28c shows that, more $Si_9$-2p state is occupied in SG-Si (B) and well mixed with $C_2$-2p state at a much broader energy level (from −1 to −9 eV) as compared with that in G-Si. Additionally, there is also a harmonic overlap between $Si_4$-2p and $S_5$-2p state (see FIG. 28d). The analysis of the PDOS revealed that the covalent synergy was mainly due to the mixing between the C-2p and Si-2p states and the $C_2$-$Si_9$ bond is much stronger than the $C_2$-$Si_4$ bonding in G-Si, which attributes to the significantly improved cycle stability.

Figure 29:
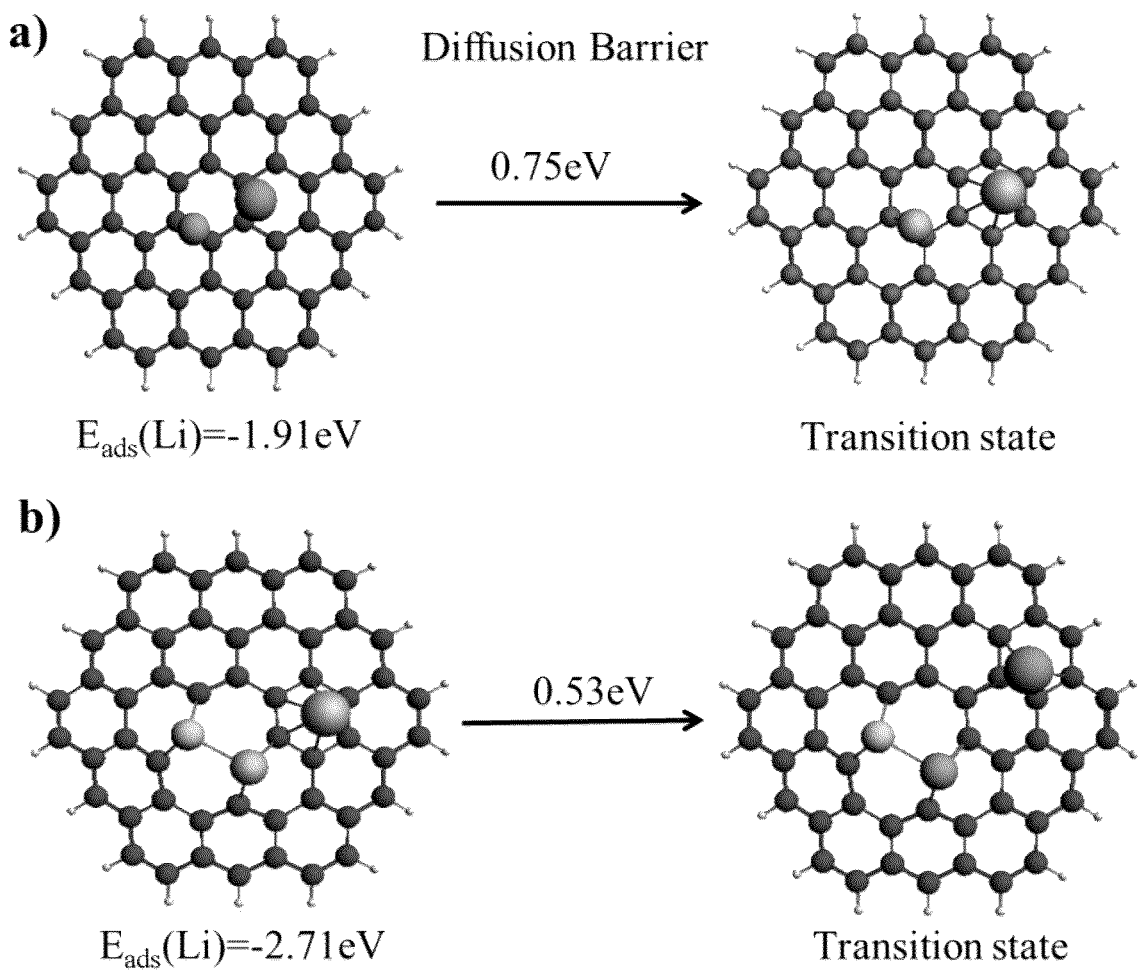
FIG. 29: Li adsorption and transition state. The figure quantifies Li diffusion barrier for a) G-Si and b) SG-Si.

The mobility of the adsorbed Li atom was also studied. FIG. 29 shows the transition state along the diffusion pathway. It was found that, for Li atom diffuses away from the aforementioned most stable sites in G-Si, it needs to overcome an energy barrier of 0.75 eV, as shown in FIG. 29a. However, the study of Li surface diffusion on SG-Si(B) cluster shows that Li diffusion proceeds with a barrier of 0.53 eV, FIG. 29b, which is slightly lower than that found on G-Si. This observation indicates that S-doped graphene could boost the mobility for Li atoms on Si-SG interface, which facilitate the charge transfer.

While not wishing to be bound by theory, it is believed that the improved cycling stability and rate capability of the Si-SG-cPAN electrode is attributed to the structurally stable nano-architectured design. It is believed that several changes occur in the electrode structure during SHT: (1) PAN is cyclized by forming graphitized carbon with 6-membered ring structure hosting the nitrogen atoms in pyridine-like assembly. (2) Silicon anchors and covalently interacts with the sulfur atoms, the activated carbon associated with nanoholes in SG, and nitrogen in the cyclized PAN. (3) The reconstruction and atomic scale architecturing of the electrode lead to a robust structure in which the SiNP are protected by a scaffold of graphene nanosheets and a web of cyclized PAN. The cyclized PAN (c-PAN) forms an effective shielding around the SiNP, which are already anchored on SG through covalent interactions as confirmed by DFT calculations. In addition, c-PAN sticks between the SG nanosheets, providing a 3-D, interconnected structure that enables enhanced conductivity and material robustness, as shown schematically in FIG. 2d.

It can be noted that the SiNP, after 2275 repetitive expansion and contraction cycles, fractured and pulverized into smaller particles. However, those fractured Si particles are still confined within the continuous channels of the c-PAN shell, which is overlaid on SG and maintains the electrical connection between Si and graphene. The synergy of the interactions among Si/SG/c-PAN leads to excellent cycle efficiency and capacity retention. The unique and elegant special arrangement in the 3D structure of the electrode provided appropriately sized voids along with elasticity which accommodated repetitive volume expansion and contraction. This results in preserving electrode integrity and prevented degradation. Furthermore, sandwiching SiNP which have been capped with cyclized PAN, between SG nanosheets forms a laminated structure with limited open channels this supresses the penetration of the electrolyte into the bulk of the electrode and limits most of the SEI formation to the surface. We believe the TEM (EELS) images shown in FIG. 13 can provide some indirect evidence that most of the SEI formed on the outside. If the SEI formed on Si nanoparticles, one should be able to see a large amount of SEI covering Si since it is difficult for the fractured SEI to come out. Another possibility is that the SEI would preferentially be formed on the defective areas in the graphene, which might prevent solvent getting into the space inside. Most of SEI appears to form on graphene surface, which is more stable comparing with those formed on Si surface.

Based on the DFT model, the Si atom has covalent interactions with a sulfur atom in SG and two adjacent carbon atoms. The equivalent strength of this covalent interaction is similar to that of a single covalent bond. This interaction may not involve the Si atom reacting directly with sulfur to form either SiS or $SiS_2$, as this would require de-bonding of sulfur from within the graphene matrix, and may result in electrode degradation. In the case of Si clusters (to simulate nanoparticles), only a small portion of the silicon atoms form this covalent interaction with the SG. It is believed that this type of Si does not participate in alloy formation with lithium; however provides an anchoring site for the majority of Si atoms within the nanoparticle that are readily available for alloying/dealloying, thereby contributing to the observed capacity.

It can be seen that Si bonds more strongly to SG than on G. One reason is the covalent interaction of Si atoms with the sulfur atom. The second reason is because the increased charge density on the defective (with nanoholes) carbon adjacent to sulfur. This indicates a covalent synergy for the interaction between Si and SG leading to a superior material electrochemical performance, which has not been seen with Si-G. It is clearly shown that, even after 2275 cycles of charge/discharge, the amorphous SiNP re-organised into channels of the cyclized PAN and the sulfur pathway on graphene, as seen in FIG. 13.

Although the invention has been described with reference to certain specific embodiments, various modifications thereof will be apparent to those skilled in the art. Any examples provided herein are included solely for the purpose of illustrating the invention and are not intended to limit the invention in any way. Any drawings provided herein are solely for the purpose of illustrating various aspects of the invention and are not intended to be drawn to scale or to limit the invention in any way. The scope of the claims appended hereto should not be limited by the preferred embodiments set forth in the above description, but should be given the broadest interpretation consistent with the present specification as a whole. The disclosures of all prior art recited herein are incorporated herein by reference in their entirety.

REFERENCES

1. Higgins D, Hoque M A, Seo M H, Wang R, Hassan F, Choi J-Y, Pritzker M, Yu A, Zhang J, Chen Z. Development and Simulation of Sulfur-doped Graphene Supported Platinum with Exemplary Stability and Activity Towards Oxygen Reduction. *Adv. Funct. Mater.* 24, 4325-4336 (2014).
2. Higgins D C, Hogue M A, Hassan F, Choi J-Y, Kim B, Chen Z. Oxygen Reduction on Graphene-Carbon Nanotube Composites Doped Sequentially with Nitrogen and Sulfur. ACS Catalysis 4, 2734-2740 (2014).
3. Hogue M A, Hassan F M, Higgins D, Choi J-Y, Pritzker M, Knights S, Ye S, Chen Z. Multigrain Platinum Nanowires Consisting of Oriented Nanoparticles Anchored on Sulfur-Doped Graphene as a Highly Active and Durable Oxygen Reduction Electrocatalyst. Adv. Mater., 1229-1234 (2014).
4. te Velde G, Baerends E J. Precise density-functional method for periodic structures. Phys. Rev. B 44, 7888-7903 (1991).
5. Wiesenekker G, Baerends E J. Quadratic integration over the three-dimensional Brillouin zone. J. Phys.: Condens. Matter 3, 6721 (1991).
6. Grimme S, Antony J, Ehrlich S, Krieg H. A consistent and accurate ab initio parametrization of density functional dispersion correction (DFT-D) for the 94 elements H-Pu. J. Chem. Phys. 132, 154104 (2010).
7. Li Y, Chen Z. X H/$\pi$ (X=C, Si) Interactions in Graphene and Silicene: Weak in Strength, Strong in Tuning Band Structures. J. Phys. Chem. Lett. 4, 269-275 (2012).
8. Arabi A A, Becke A D. Assessment of the PW86+PBE+XDM density functional on van der Waals complexes at non-equilibrium geometries. J. Chem. Phys. 137, 014104 (2012).
9. Arbab S, Mirbaha H, Zeinolebadi A, Nourpanah P. Indicators for evaluation of progress in thermal stabilization reactions of polyacrylonitrile fibers. J. Appl. Polym. Sci. 131, 40343 (2014).
10. Korobeinyk A V, Whitby R L D, Mikhalovsky S V. High temperature oxidative resistance of polyacrylonitrile-methylmethacrylate copolymer powder converting to a carbonized monolith. Eur. Polym. J. 48, 97-104 (2012).
11. Wang Y-X, Wang C-G, Wu J-W, Jing M. High-temperature DSC study of polyacrylonitrile precursors during their conversion to carbon fibers. J. Appl. Polym. Sci. 106, 1787-1792 (2007).
12. Wangxi Z, Jie L. Comparative study on preparing carbon fibers based on PAN precursors with different comonomers. J. Wuhan Univ. Technol.-Mat. Sci. Edit. 21, 26-28 (2006).
13. Wang H, Maiyalagan T, Wang X. Review on Recent Progress in Nitrogen-Doped Graphene: Synthesis, Characterization, and Its Potential Applications. ACS Catalysis 2, 781-794 (2012).
14. Takahagi T, Shimada I, Fukuhara M, Morita K, Ishitani A. XPS studies on the chemical structure of the stabilized polyacrylonitrile fiber in the carbon fiber production process. *J. Polym. Sci. Part A: Polym. Chem.* 24, 3101-3107 (1986).
15. Choi C H, Park S H, Woo S I. Heteroatom doped carbons prepared by the pyrolysis of bio-derived amino acids as highly active catalysts for oxygen electro-reduction reactions. Green Chem. 13, 406-412 (2011).
16. Wohlgemuth S-A, Vilela F, Titirici M-M, Antonietti M. A one-pot hydrothermal synthesis of tunable dual heteroatom-doped carbon microspheres. Green Chem. 14, 741-749 (2012).
17. Paraknowitsch J P, Thomas A, Schmidt J. Microporous sulfur-doped carbon from thienyl-based polymer network precursors. Chem. Commun. 47, 8283-8285 (2011).
18. Morgan W E, Van Wazer J R. Binding energy shifts in the x-ray photoelectron spectra of a series of related Group IVa compounds. J. Phys. Chem. 77, 964-969 (1973).
19. Yang S, Zhi L, Tang K, Feng X, Maier J, Müllen K. Efficient Synthesis of Heteroatom (N or S)-Doped Graphene Based on Ultrathin Graphene Oxide-Porous Silica Sheets for Oxygen Reduction Reactions. Adv. Funct. Mater. 22, 3634-3640 (2012).
20. Yang Z, Yao Z, Li G, Fang G, Nie H, Liu Z, Zhou X, Chen Xa, Huang S. Sulfur-Doped Graphene as an Efficient Metal-free Cathode Catalyst for Oxygen Reduction. ACS Nano 6, 205-211 (2011).
21. Yubero F, Holgado J P, Barranco A, González-Elipe A R. Determination of surface nanostructure from analysis of electron plasmon losses in XPS. Surf. Interface Anal. 34, 201-205 (2002).
22. Yu Y, Tang Z, Jiang Y, Wu K, Wang E. Thickness dependence of the surface plasmon dispersion in ultrathin aluminum films on silicon. Surf. Sci. 600, 4966-4971 (2006).
23. Grosvenor A P, Biesinger M C, Smart RSC, McIntyre N S. New interpretations of XPS spectra of nickel metal and oxides. Surf. Sci. 600, 1771-1779 (2006).
24. Magasinski A, Dixon P, Hertzberg B, Kvit A, Ayala J, Yushin G. High-performance lithium-ion anodes using a hierarchical bottom-up approach. Nat. Mater. 9, 461-461 (2010).
25. Lee S W, McDowell M T, Berla L A, Nix W D, Cui Y. Fracture of crystalline silicon nanopillars during electrochemical lithium insertion. Proc. Natl. Acad. Sci. 109, 4080-4085 (2012).
26. Liu N, Lu Z D, Zhao J, McDowell M T, Lee H W, Zhao W T, Cui Y. A pomegranate-inspired nanoscale design for large-volume-change lithium battery anodes. Nat. Nanotechnol. 9, 187-192 (2014).
27. Liu B, Soares P, Checkles C, Zhao Y, Yu G. Three-Dimensional Hierarchical Ternary Nanostructures for High-Performance Li-Ion Battery Anodes. Nano Lett. 13, 3414-3419 (2013).
28. Key B, Morcrette M, Tarascon J-M, Grey C P. Pair Distribution Function Analysis and Solid State NMR Studies of Silicon Electrodes for Lithium Ion Batteries:

Understanding the (De)lithiation Mechanisms. J. Am. Chem. Soc. 133, 503-512 (2010).

29. Rochefort A, Salahub D R, Avouris P. The effect of structural distortions on the electronic structure of carbon nanotubes. Chem. Phys. Lett. 297, 45-50 (1998).

We claim:

1. A method for preparing an anode comprising:
combining silicon (Si), sulfur doped graphene (SG) and polyacrylonitrile (PAN) to form a slurry;
coating the slurry on a current collector; and
subjecting the current collector coated with the slurry to a sluggish heat treatment (SHT).

2. The method of claim 1 wherein the SHT comprises gradual heating of 1-12° C. per minute to a peak temperature in the range of about 300° C. to about 700° C.

3. The method of claim 2 wherein the peak temperature is about 500° C.

4. The method of claim 2 wherein the peak temperature is about 450° C.

5. The method of claim 1 wherein the SHT comprises heating at a rate in the range of about 1-12° C. per minute.

6. The method of claim 1 further comprising a cooling step following the SHT wherein the cooling step comprises cooling at a rate in the range of about 1-12° C. per minute.

7. The method of claim 1 wherein the Si is one or more of Si powder, Si nanowire, Si nanoparticle (SiNP), Si sol particle, Si rod, and a combination thereof.

8. The method of claim 1 wherein the Si is Si nanoparticle (SiNP).

9. The method of claim 1 wherein the current collector is a copper current collector.

10. The method of claim 1 wherein the SHT comprises heating at a rate of 5° C. per minute and to a temperature of 450° C. sufficient to cause cyclization of the PAN.

11. The method of claim 1 wherein a catalyst is added to catalyze cyclization of the PAN.

12. The method of claim 11 wherein the catalyst is graphitic oxide (GO).

13. The method of claim 1 wherein a solvent is added when forming the slurry.

14. The method of claim 13 wherein the solvent is dimethylformamide (DMF).

15. The method of claim 1 wherein the coating is dried before the SHT.

16. The method of claim 1 wherein the coating on the current collector comprises the Si bound to the SG and at least partially encompassed in a shell of cyclized PAN (c-PAN).

* * * * *